US009464725B2

(12) United States Patent
Bianchi et al.

(10) Patent No.: US 9,464,725 B2
(45) Date of Patent: Oct. 11, 2016

(54) ANTI-FLOODING SAFETY DEVICE FOR HOUSEHOLD APPLIANCES, IN PARTICULAR WASHING MACHINES

(75) Inventors: Luciano Bianchi, Alessandria (IT); Paolo Savini, Alessandria (IT)

(73) Assignee: ELTEK S.P.A., Rivoli, Casale Monferrato (Alessandria) (IT)

( * ) Notice: Subject to any disclaimer, the term of this patent is extended or adjusted under 35 U.S.C. 154(b) by 165 days.

(21) Appl. No.: 14/111,948

(22) PCT Filed: Apr. 12, 2012

(86) PCT No.: PCT/IB2012/051800
§ 371 (c)(1),
(2), (4) Date: Dec. 20, 2013

(87) PCT Pub. No.: WO2012/140598
PCT Pub. Date: Oct. 18, 2012

(65) Prior Publication Data
US 2014/0158226 A1  Jun. 12, 2014

(30) Foreign Application Priority Data

Apr. 15, 2011 (IT) .............................. TO20110035 U

(51) Int. Cl.
*F16K 23/00* (2006.01)
*F16K 17/36* (2006.01)
(Continued)

(52) U.S. Cl.
CPC .............. *F16K 17/36* (2013.01); *A47L 15/421* (2013.01); *D06F 39/081* (2013.01); *Y10T 137/7758* (2015.04)

(58) Field of Classification Search
CPC ................... Y10T 137/5762; A47L 15/4212; D06F 39/081; F16L 11/12; F16L 11/20; F16L 2201/30; F16K 17/36
USPC .......... 137/312; 285/13, 123.1; 138/113, 114
See application file for complete search history.

(56) References Cited

U.S. PATENT DOCUMENTS 4,341,235 A * 7/1982 Nord ....................... F16L 39/02
137/312
5,348,044 A * 9/1994 Eugene ................. F16L 59/161
137/312
(Continued)

FOREIGN PATENT DOCUMENTS

DE       3618258 A1   2/1987
DE       3743842 A1   9/1988
(Continued)

OTHER PUBLICATIONS

International Search Report for PCT/IB2012/051800 dated Feb. 14, 2013.

*Primary Examiner* — John Fox
*Assistant Examiner* — Reinaldo Sanchez-Medina
(74) *Attorney, Agent, or Firm* — Heslin Rothenberg Farley & Mesiti P.C.; Victor A. Cardona, Esq.

(57) ABSTRACT

An anti-flooding safety device for a user apparatus includes: a first connection body defining a first duct, the first duct having an inlet and an outlet, the inlet of the first duct being provided for connection to a supply point of a mains supply. An inner flexible hose and an outer flexible hose are impermeable to water, wherein the inner hose has a proximal end, which is sealingly fixed in a position corresponding to the outlet of the first duct, and a distal end for connection to the user apparatus, and wherein the inner hose extends longitudinally within the outer hose so that between at least part of the two hoses a gap is defined designed to convey to the user apparatus and/or to withhold inside it any possible leaking water. A valve arrangement on the first connection body can be switched from a position of opening of the first duct to a position of closing of the first duct following upon detection of a leakage of water. The axis of the inlet extends in a direction transverse to the axis of the outlet.

19 Claims, 13 Drawing Sheets

(51) Int. Cl.
*A47L 15/42* (2006.01)
*D06F 39/08* (2006.01)

(56) References Cited

U.S. PATENT DOCUMENTS

| | | | | |
|---|---|---|---|---|
| 5,782,579 A | * | 7/1998 | Dupouy et al. | 405/52 |
| 5,931,184 A | * | 8/1999 | Armenia | F16L 39/005 |
| | | | | 137/312 |
| 6,895,788 B2 | * | 5/2005 | Montgomery | 68/12.02 |
| 7,124,774 B2 | * | 10/2006 | Weingarten | F16K 31/1266 |
| | | | | 137/514.7 |
| 8,183,872 B2 | * | 5/2012 | Stark | 324/539 |
| 2002/0088490 A1 | * | 7/2002 | Selby et al. | 137/312 |
| 2007/0074759 A1 | * | 4/2007 | McClung, Jr. | 137/68.14 |
| 2011/0036436 A1 | * | 2/2011 | Haltmayer et al. | 137/872 |

FOREIGN PATENT DOCUMENTS

| | | | | |
|---|---|---|---|---|
| DE | 4402502 A1 | | 8/1994 | |
| EP | 0474569 A1 | * | 3/1992 | D06F 39/081 |
| EP | 0555679 A1 | | 8/1993 | |
| EP | 0609842 A1 | | 8/1994 | |
| EP | 1798326 A1 | | 12/2005 | |
| JP | H02128793 A | | 5/1990 | |
| JP | 2000014983 A | | 1/2000 | |
| JP | 200121064 A | | 7/2001 | |

* cited by examiner

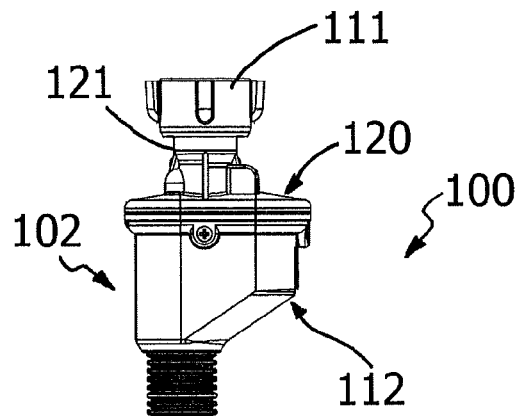
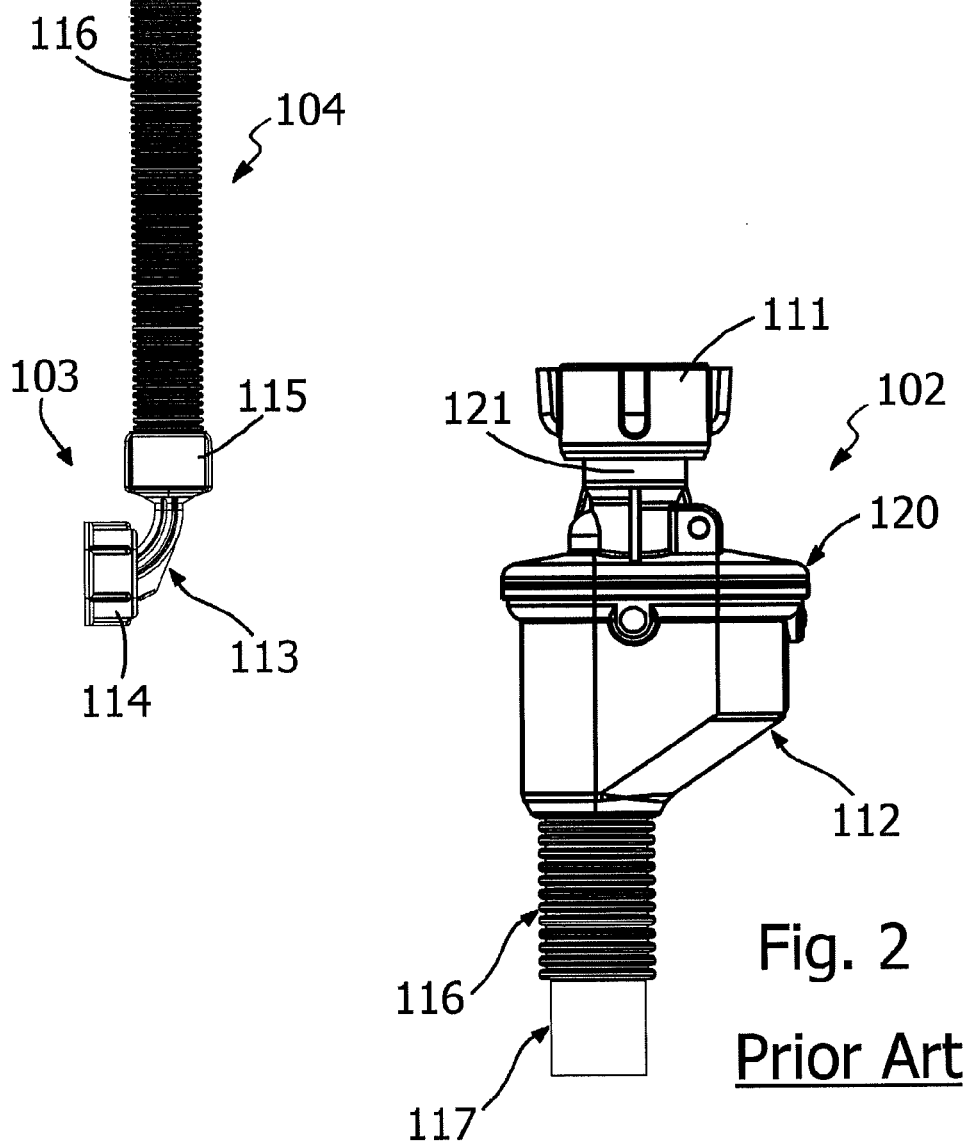
Fig. 1
Prior Art
Fig. 2
Prior Art

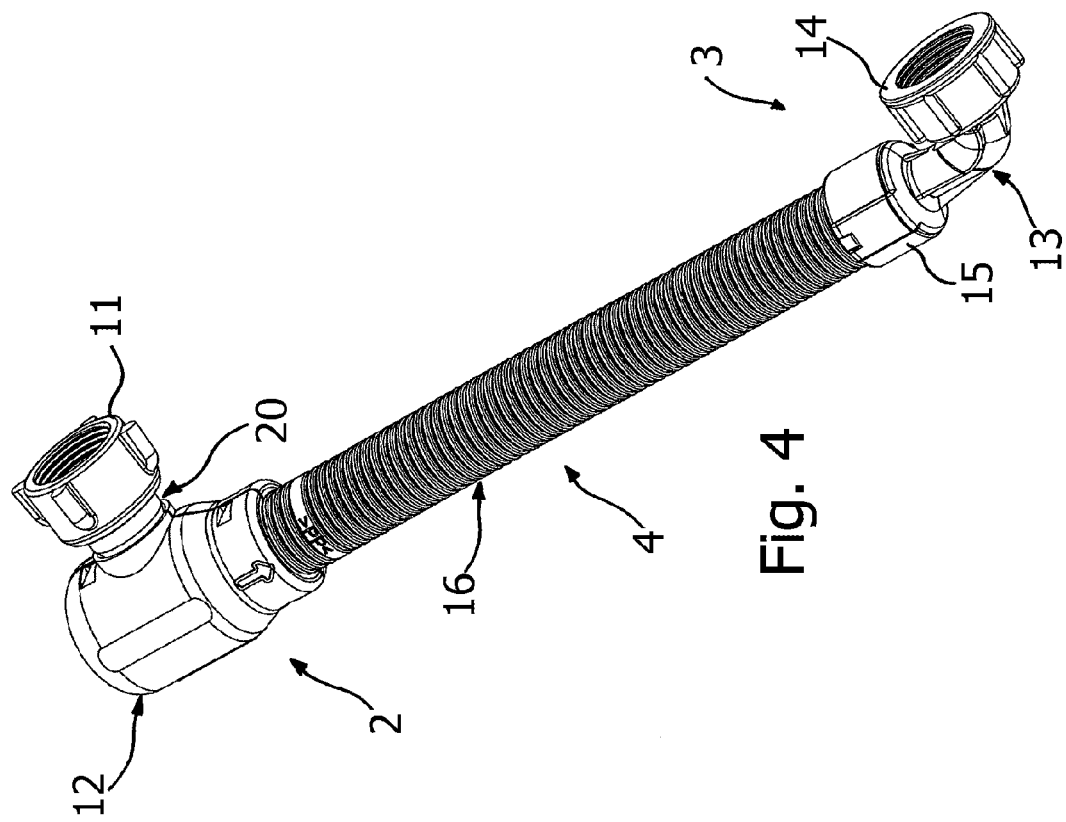
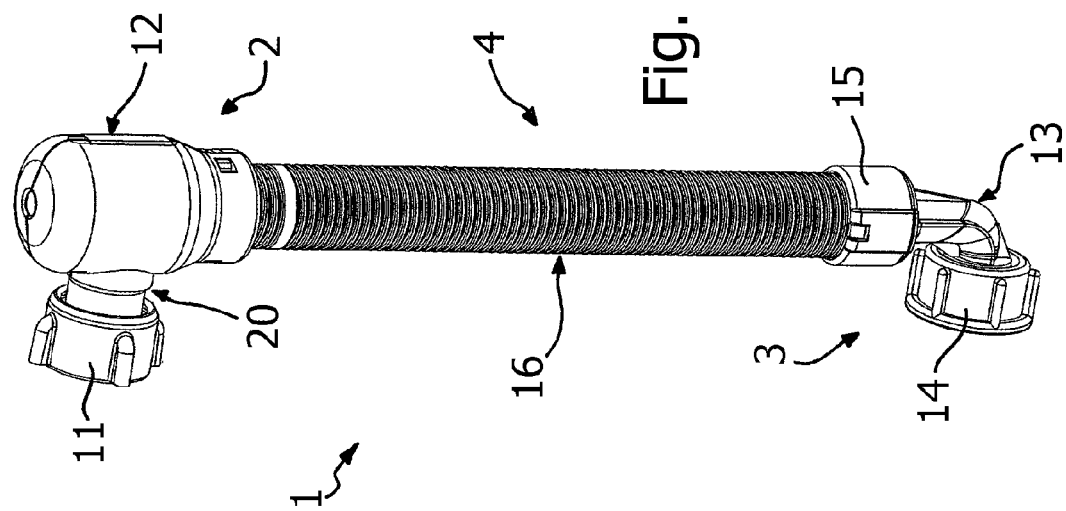

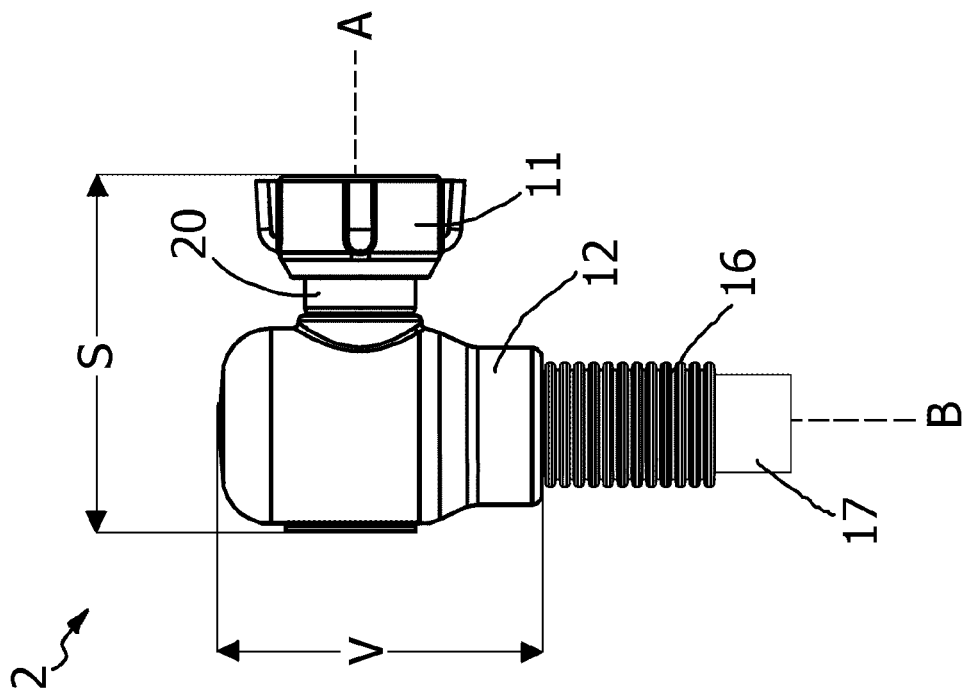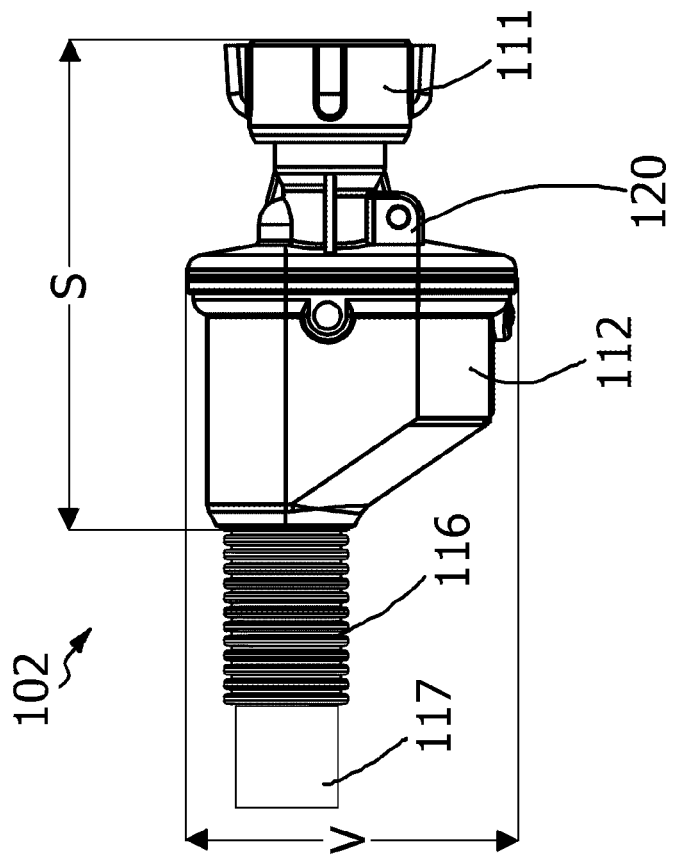
Fig. 9

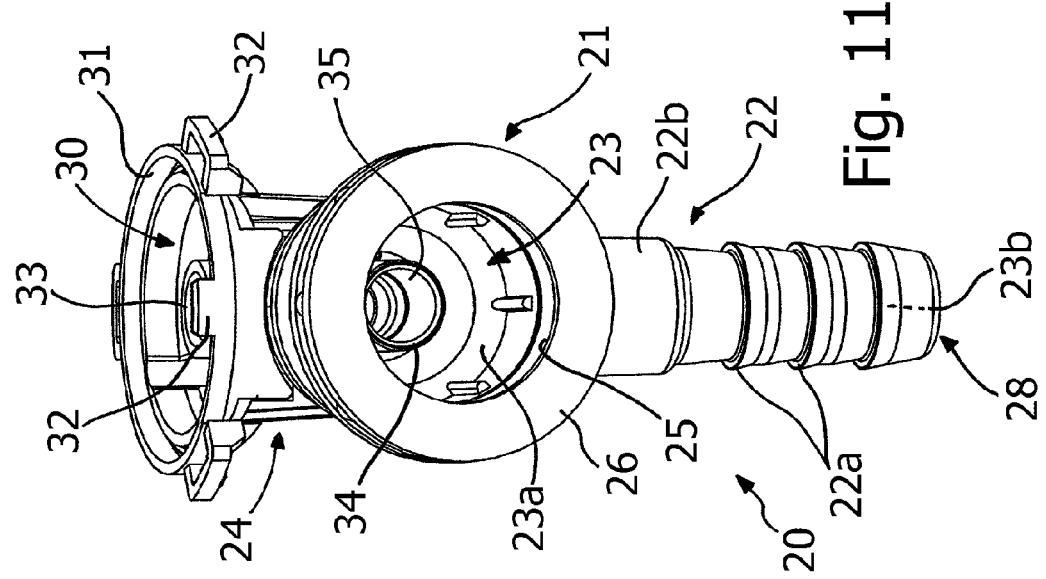
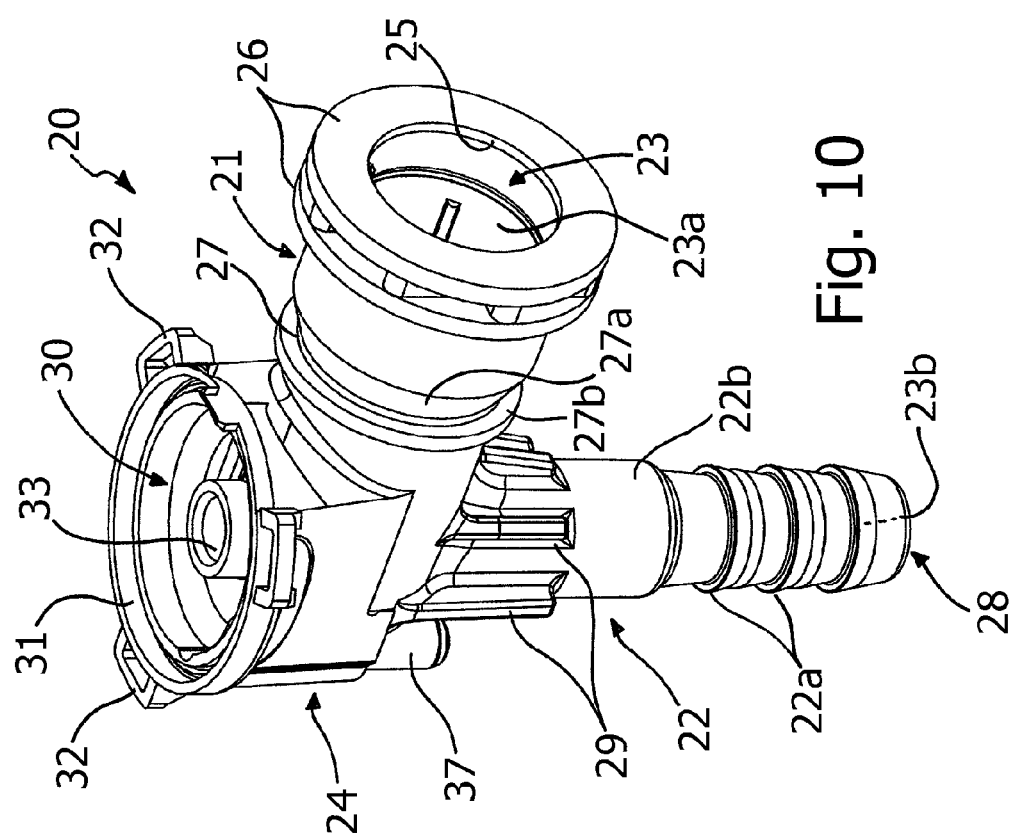

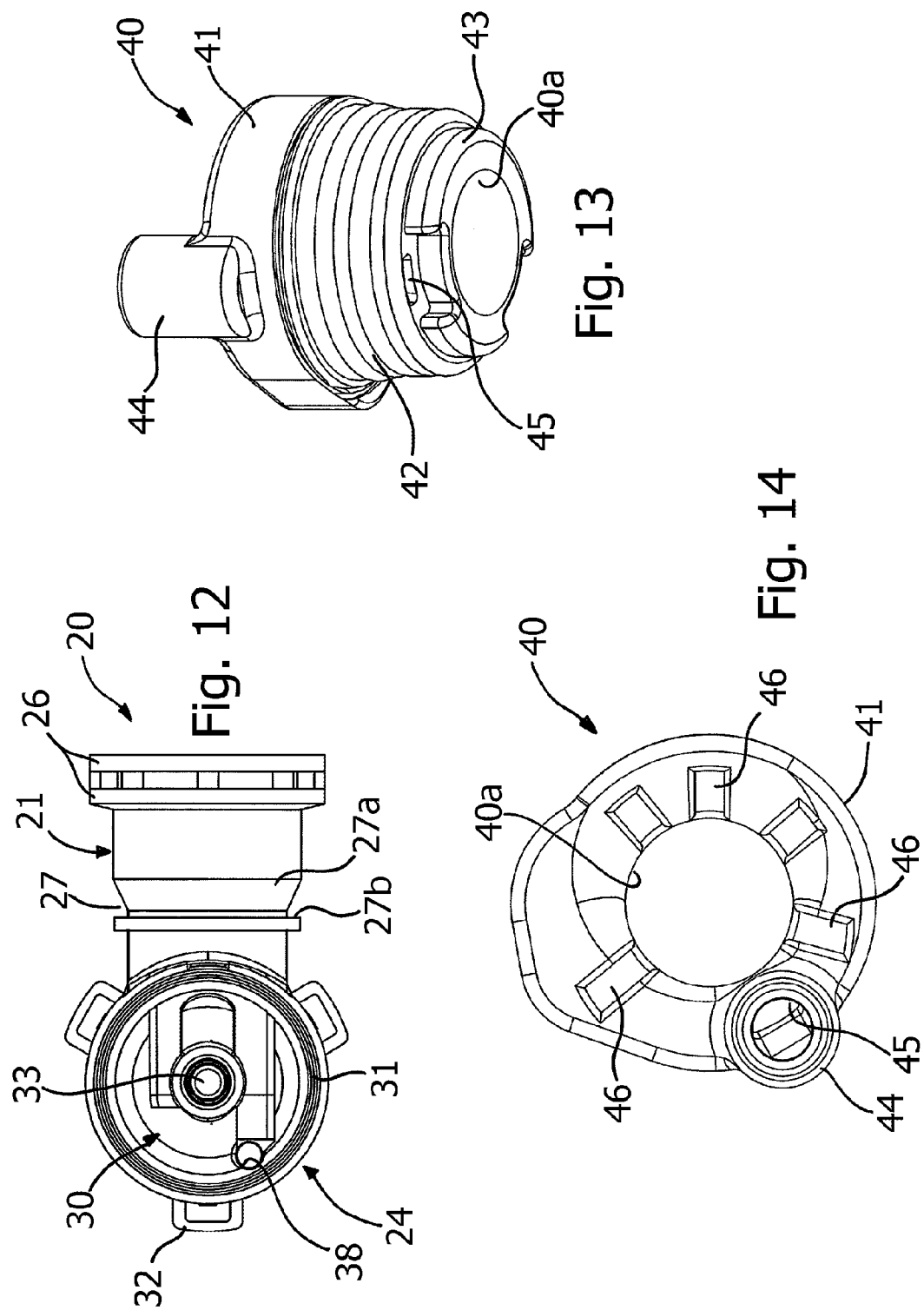

ANTI-FLOODING SAFETY DEVICE FOR HOUSEHOLD APPLIANCES, IN PARTICULAR WASHING MACHINES

CROSS REFERENCE TO RELATED APPLICATIONS

This application is a 371 National Phase of PCT International Application No. PCT/IB2012/051800 filed on Apr. 12, 2012, and published in English as WO 2012/140598 A2 on Oct. 18, 2012, which claims priority to Italian Patent Application No. TO2011U000035 filed on Apr. 15, 2011, the entire disclosures of which are incorporated herein by reference.

FIELD OF THE INVENTION

The present invention relates to a safety device against leakage of water, in particular an anti-flooding safety device, designed for connection between a supply point of a mains water supply and an apparatus that uses water, such as a domestic appliance or an electric household appliance. More in particular, the invention regards a said safety device of the type that comprises:
- at least one first connection body defining a first duct for the water, the first duct having an inlet and an outlet that extend according to respective longitudinal axes, the inlet of the first duct being provided for connection to the supply point of the mains supply;
- an inner flexible hose and an outer flexible hose impermeable to water, wherein the inner hose has a proximal end, which is sealingly connected to the outlet of the first duct, and a distal end, which is provided for fluid connection to the user apparatus, and wherein the inner hose extends longitudinally within the outer hose so that defined between at least part of the two hoses is a gap designed to convey to the user apparatus and/or to withhold inside it any possible leaking water; and
- a valve arrangement mounted on the first connection body comprising an open/close member, designed to pass from a position of opening of the first duct to a position of closing of the first duct following upon detection of a leakage of water.

PRIOR ART

Safety devices for household appliances of the type referred to are widely known, in particular for use in laundry-washing machines and dish-washers. Typically, in anti-flooding devices the inner hose is designed to convey the water from a supply point of the mains water supply within the household appliance, whereas the outer hose has the function of preventing any possible water leaking from the inner hose from possibly being dispersed in the domestic environment, causing flooding. In the majority of known solutions one of the two connection bodies, typically the one designed for connection to the supply point of the mains water supply, is equipped with a valve arrangement, including an open/close member that closes the duct internal to the body itself in the case where a leakage of water is detected.

In a first type of known solutions, the outer hose and the gap are open at the bottom towards the inside of the household appliance, where a tray is provided for collecting any possible leaking water. Operative within said tray is a sensor device that may be of an electromechanical type (for example, a float with a microswitch associated thereto) or else of a mechanical type (based upon the expansion of an anhydrous sponge, which increases in volume when it comes into contact with a liquid). Irrespective of the type of sensor, the arrangement is such that, upon detection of water within the tray, the sensor generates a control signal (which may be electrical, pneumatic, or mechanical, according to the cases) that determines switching of the valve arrangement provided in the connection body and hence closing of the duct for inflow of the water. In this way, in the presence of a failure of the inner hose for delivering the water, any further inflow and hence the risk of flooding is prevented. These safety devices present the advantage of interrupting the supply of water also in the case where the leakage is not due to a failure of the inner hose, but rather to failures of different hydraulic components mounted inside the household appliance.

Also known are anti-flooding safety devices of a second type, which are simpler than the previous ones and do not presuppose a particular pre-arrangement of the household appliance. In this second type of devices, the gap defined between the inner hose and the outer hose is substantially closed also at the bottom end so as to be able to accumulate any possible water leaking from the inner hose. Devices of this sort typically base their operation on the use of an anhydrous sponge, which is operatively set in a position corresponding to the first connection body, in fluid communication with the gap. The anhydrous sponge is usually coupled to an arrest member, mounted movable between a position of withholding and a position of release of the open/close member of a mechanical valve. When the sponge is in its anhydrous condition, the aforesaid arrest member withholds the open/close member in the position of opening of the duct. In the event of a leakage, the water collected in the gap rises until it comes into contact with the sponge, causing an increase in volume thereof and hence a displacement of the arrest member towards the position of release so that the open/close member of the valve can close the duct for inflow of the water.

Anti-flooding safety devices of the type referred to previously are known, for example, from the German patent application No. DE-A-3618258 filed in the name of the present applicant, on which the preamble of Claim 1 is based.

Aims and Summary of the Invention

In the anti-flooding safety devices according to the known art, regardless of their type, the connection body designed for connection of the supply point to the mains supply, i.e., the one including the valve arrangement, is configured so that the corresponding inlet and outlet are set substantially coaxial or according to axes that are substantially parallel to one another. The duct inside the connection body provided for connection to the household appliance can be rectilinear or else—in particular, in the case of safety devices with gap closed at the bottom end—include two axially extended portions that are perpendicular to one another.

By way of example, FIG. 1 is a schematic illustration of an anti-flooding safety device produced by the present applicant (code 10.0269), the top part of which is obtained according to Claim 1 of the German patent No. DE-C-3743842. FIG. 2 illustrates at an enlarged scale the corresponding connection body designed for connection to the supply point of the mains supply.

The device, designated as a whole by 100, basically comprises two end parts 102 and 103 and an intermediate part 104. The top end part 102 is designed for hydraulic, as well as mechanical, connection to a suitable supply point of the mains supply, such as a tap (not represented), whilst the bottom part 103 is designed for hydraulic and mechanical connection to the household appliance (not represented either).

The top part 102 comprises a first connection body 120, defined hereinafter as "valve body", a ring-nut 111 for connection to the water-supply point, and a casing body 112, sealingly fitted at the top to the top part of the valve body 120 and conveyed in which is the leaking water.

The bottom part 103 includes a second connection body 113, with a corresponding ring-nut 114 associated thereto for connection to the household appliance, as well as some further components for fixing and sealing with respect to the intermediate portion 104, which comprise a bushing or lock ring 115. The intermediate part 104 basically consists of an outer hose 116, in particular a corrugated hose, within which there extends an inner hose with a smooth surface, partially visible in FIG. 2, where it is designated by 117. The maximum external diameter of the inner hose 117 is smaller than the minimum internal diameter of the outer hose 116, so that an annular gap is defined between them.

As may be seen in particular in FIG. 2, the valve body 120 includes an axially extended inlet portion 121, associated to which is the ring-nut 111. The valve body 120 then has an outlet portion (not visible in so far as it is enclosed within the casing 112), sealingly fixed to which is a proximal end of the inner hose 117, the proximal end of the outer hose 116 being, instead, sealingly fitted to the bottom part of the casing 112. In the case of the device 100 of a known type, the valve body 120 defines a duct—which extends between the inlet and the outlet referred to above—along which valve means of a mechanical type operate, which can be actuated by an anhydrous sponge. Said duct has two end portions, namely, a top portion or inlet (which extends in part inside the portion 121) and a bottom portion or outlet (connected to which is the proximal end of the inner hose 117), which extend in directions substantially parallel to one another.

In the case of the known device in question, the two aforesaid end portions of the duct are slightly staggered and joined axially on a respective side portion (see, for reference, FIG. 2 of DE-C-3743842; for similar known solutions, see, by way of example, also the documents Nos. EP-A-555679 and EP-A-609842).

This type of configuration of the inlet and of the outlet of the valve body 120 leads, in certain conditions of installation, to some drawbacks of a practical nature, for example, when a threaded attachment of the mains water supply—to which there must be fixed the ring-nut 111—extends horizontally, or else when the aforesaid attachment extends vertically but the conditions of installation of the household appliance impose the need for the intermediate part 104 of the device 100 to be positioned substantially horizontally or transversely between said attachment and the household appliance. Consider, for example, that, in the case of installation on a vertical attachment of this sort, the intermediate part 104 of the device 100 must then be curved to extend transversely, and this typically entails a reduction in the useful length of the hose owing to the curvature (which, as will be clarified in what follows, must not be too narrow). Said condition is typical in the case of a laundry-washing machine or dish-washer, where the safety device is typically connected to a tap that is located at the side of the machine, so as to be accessible to the user, or even more unfavourably in the case of built-in washing machines, where said tap is typically much further away (for example, typically under the kitchen sink).

These situations of installation lead to an increased encumbrance of the device 100 and, above all, to significant bends of the inner hose for delivering the water. In the event of bending, the inner hose tends to get kinked or squeezed on itself, bringing about a reduction of the section of passage for the liquid. A bend or a local kink can also cause excessive pressure in the inner hose for taking in the water, which are not directly detectable by the user but are potentially harmful both for the integrity of the device and for proper operation of the household appliance.

The aim of the present invention is basically to overcome the aforesaid drawbacks of the known art by means of an anti-flooding safety device which is simple and economically advantageous to produce, as well as being precise and reliable in operation. The above and yet other purposes, which will emerge more clearly in what follows, are achieved according to the present invention by a safety device having the characteristics specified in Claim 1. Preferential characteristics are specified in the dependent claims. The claims form an integral part of the technical teaching provided herein in relation to the invention.

In brief, according to the invention, in a safety device as described at the start, the axis of the inlet of the duct of the first connection body extends in a direction transverse to the axis of the outlet of the duct itself. Preferably, the axis of said inlet and the axis of said outlet form between them an angle comprised between 90° and 135°, preferably between 90° and 115°. In the embodiment of the invention currently deemed preferential, the aforesaid axes are substantially set orthogonal to one another.

Thanks to said arrangement, the inlet of the first connection body is angled with respect to the outlet, and hence with respect to the proximal end of the inner hose for taking in the water: this enables reduction of bending of the inner hose in the cases referred to previously. Said arrangement also enables mounting of the first connection body on attachments for water set horizontally, with comparatively very small overall dimensions as compared to the known art. The solution proposed then enables reduction of the overall dimensions of the first connection body in particular when this includes a valve arrangement.

BRIEF DESCRIPTION OF THE DRAWINGS

Further aims, characteristics, and advantages of the invention will emerge clearly from the ensuing detailed description, with reference to the annexed drawings, which are provided purely by way of explanatory and non-limiting example and in which:

FIGS. 1 and 2 are a schematic view in side elevation, an overall view, and an enlarged partial view, respectively, of an anti-flooding safety device of a known type;

FIGS. 3 and 4 are perspective views from different angles of an anti-flooding safety device in accordance with a possible embodiment of the present invention;

FIG. 9 is a schematic view that compares the valve body of a device according to FIGS. 1 and 2 with the valve body of a device according to FIGS. 3 and 4;

FIGS. 10 and 11 are perspective views, from different angles, of a first connection body or valve body of a device provided in accordance with a possible embodiment of the invention;

FIG. 12 is a top plan view of the valve body of FIGS. 10 and 11;

FIGS. 13 and 14 are a perspective view and a top plan view, respectively, of a sealing member designed for assembly on the valve body of FIGS. 10 and 11;

DETAILED DESCRIPTION OF PREFERRED EMBODIMENTS OF THE INVENTION

Figure 5:
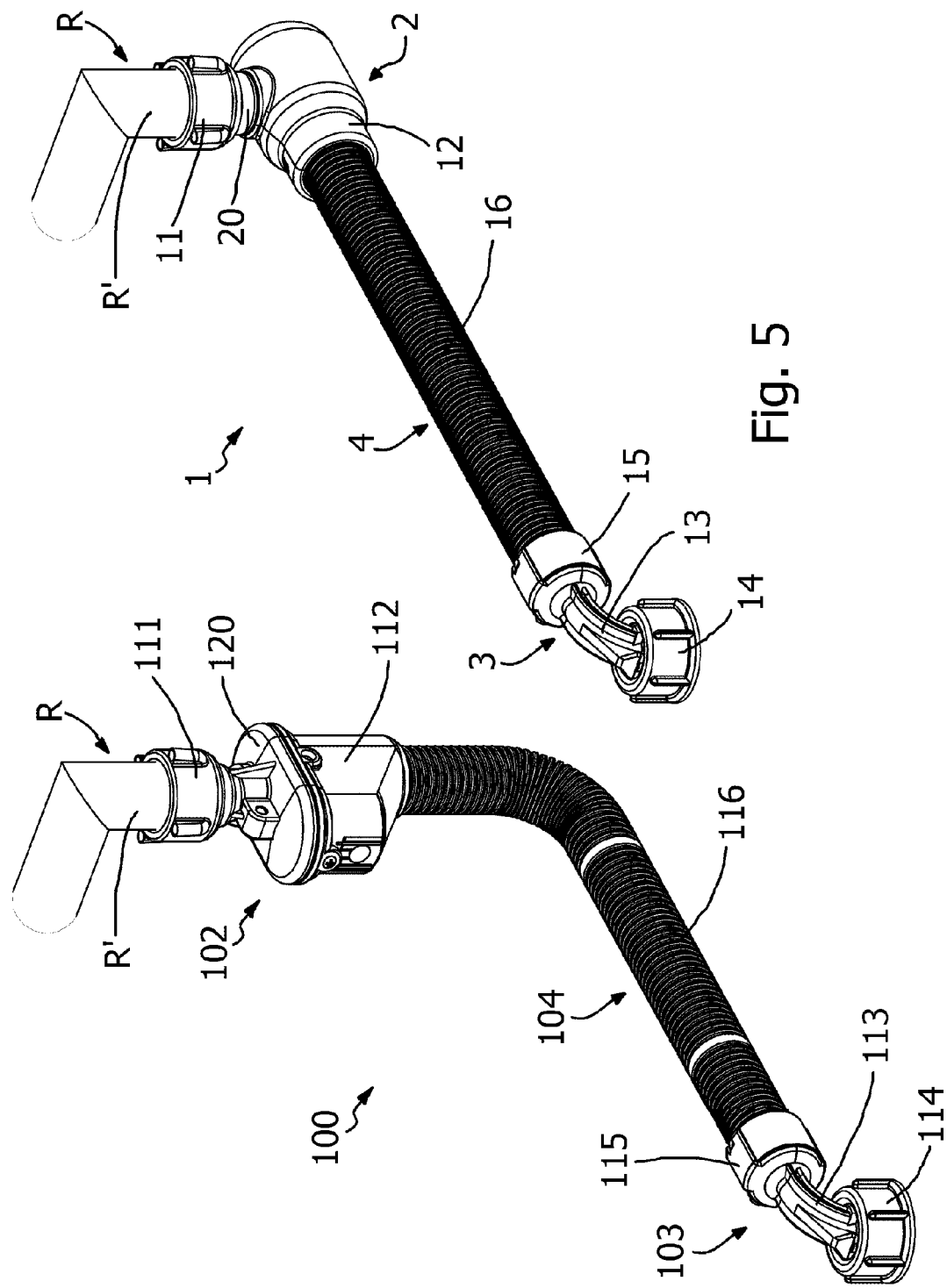
FIGS. 5, 6, 7, and 8 are schematic views that compare a device according to FIGS. 1 and 2 with the device of FIGS. 3 and 4, in different configurations of installation.

Reference to "an embodiment" or "one embodiment" within the framework of the present description is intended to indicate that a particular configuration, structure, or characteristic described in relation to the embodiment is comprised in at least one embodiment. Hence, phrases such as "in an embodiment" or "in one embodiment" and the like, that may be present in different points of the present description, do not necessarily all refer to one and the same embodiment. Furthermore, the details, configurations, structures, or characteristics can be combined in any adequate way in one or more embodiments, even different from the ones exemplified. The references used in what follows are merely provided for convenience and do not define the sphere of protection or the scope of the embodiments.

It is pointed out that, in the sequel of the present description and in the attached claims, reference will only be made for simplicity to leakage of a fluid or water from the inner hose of the device, due, for example, to failure of the latter, intending as being, however, included the case of leakage of a fluid or water that occurs in other parts of the device even in the absence of a failure of the inner hose (for example, a leakage of water between the inner hose and the valve body or the second connection body, on account of yielding of corresponding sealing means).

In FIGS. 3 and 4, designated as a whole by 1 is an anti-flooding safety device according to a possible embodiment of the present invention. In the example, the device 1 is of the type provided with a gap closed also at the bottom end, and hence does not presuppose a particular pre-arrangement of the household appliance. It should be noted in any case that the invention may be applied also to the case of devices where the outer hose and the gap are open at the bottom, towards the inside of the household appliance.

As per the known art, the device 1 comprises two end parts 2 and 3 and an intermediate part 4, where the top part 2 is designed for hydraulic, as well as mechanical, connection to a suitable supply point of the mains supply, such as a hydraulic attachment (not represented), whilst the bottom part 3 is designed for hydraulic and mechanical connection to the household appliance (not represented either). Consider that the aforesaid bottom part 3 may even be absent, for example, in the case of a gap open at the distal end, i.e., at the bottom (the distal ends of the inner hose and/or of the outer hose could hence be connected directly to the user apparatus, without a bottom part 3).

The top part 2 comprises a first connection body 20 or valve body, associated to which are a valve arrangement, sealing means described hereinafter, first connection means 11—such as a threaded ring-nut—for connection to the aforesaid hydraulic attachment and a casing body 12, which encloses the valve body 20 at least partially. The bottom part 3 includes a second connection body 13, with corresponding second connection means 14—such as a threaded ring-nut—associated thereto for connection to the household appliance, as well as some further components for fixing and sealing with respect to the intermediate portion 4, which are of a type in itself known and preferably comprise a bushing or lock ring 15. The intermediate part 4 basically consists of an inner hose (not visible in FIGS. 3 and 4) and an outer hose 16, such as a hose made of thermoplastic material. In the non-limiting embodiment illustrated, the outer hose 16 is a corrugated hose or a hose with undulating wall, i.e., with a substantially cylindrical wall that defines an alternation of crests and troughs, preferably annular and/or parallel to one another and/or arranged according to a regular series. The wall of the outer hose 16 could on the other hand have a continuous trough and crest, with a helical development, or other shape designed for the purpose. In the example described herein, the inner hose—designated by 17 in the FIGS. 9, 16 and 18—is preferably a cylindrical hose with a smooth surface, such as a hose made of thermoplastic material or elastomeric material, but said conformation is not to be understood as in any way limiting in so far as also the inner hose 17 could be of a corrugated type, for example, with shapes of the type described for the outer hose 16. Preferably, the maximum external diameter of the inner hose 17 is smaller than the minimum internal diameter of the outer hose 16, in such a way that between them there is defined an annular gap, designated by 18 in FIGS. 16 and 18.

As may be noted, in the non-limiting example illustrated, the inlet of the valve body, including the ring-nut 11, is oriented at approximately 90° with respect to the outlet of the valve body, here not visible but in any case substantially parallel or coaxial to the development of the outer hose 16 illustrated, and hence are oriented at approximately 90° with respect to the proximal end of the inner hose 17 for taking in the water.

As will emerge clearly hereinafter, in a preferred embodiment, said arrangement is rendered possible in that the internal duct of the valve body comprises a first duct portion and a second duct portion, which extend axially in directions transverse or angled with respect to one another, preferably in directions substantially orthogonal to one another, with the inlet and the outlet of the connection body—i.e., of said internal duct—that are defined, respectively, at the inlet end of the first duct portion and at the outlet end of the second duct portion.

In FIG. 5, a known device 100 and a device 1 according to the invention are compared, in one and the same first condition of installation. In particular, in said figure designated as a whole by R is a supply point of a mains supply, and in particular a hydraulic attachment having a threaded terminal portion R' oriented vertically or perpendicular to a corresponding wall (not represented), such as the typical configuration of a tap fixed in the wall of a dwelling. In the condition of installation illustrated, moreover, the household appliance with the corresponding hydraulic attachment (not represented), to which the connection bodies 113 and 13 must be connected, is positioned to the left of the attachment R (it may be noted that in FIG. 5 the bodies 113 and 13, with the corresponding ring-nuts 114 and 14, are oriented downwards only for requirements of representation; in the condition of effective installation the connection bodies will be set facing, with the ring-nuts facing frontally, the observer of the sheet of FIG. 5).

We shall assume that the household appliance in question is a washing machine, such as a laundry-washing machine or a dish-washer.

As emerges, with an installation of this sort, the known device 100 imposes a significant bend on the outer hose, and hence on the inner hose (not visible), with the drawbacks referred to previously. Thanks to the particular construction of its valve body 20, instead, the device 1 according to the invention can be installed without any significant bends in its hoses. Of course, even though the figure illustrates a perfectly horizontal orientation of the outer hose, and hence also of the inner hose, in practice the two hoses may possibly be inclined differently, for example, from above downwards, starting from the valve body towards the household appliance. It will be appreciated in any case that the connection may be obtained in the absence of significant bends in the hoses themselves. Moreover, given the same length of the safety devices 1 and 100, the device 1 according to the invention enables a connection with apparatuses located at a greater distance as compared to a device 100 according to the known art, given the absence of any bending of the intermediate portion 4.

Figure 6:
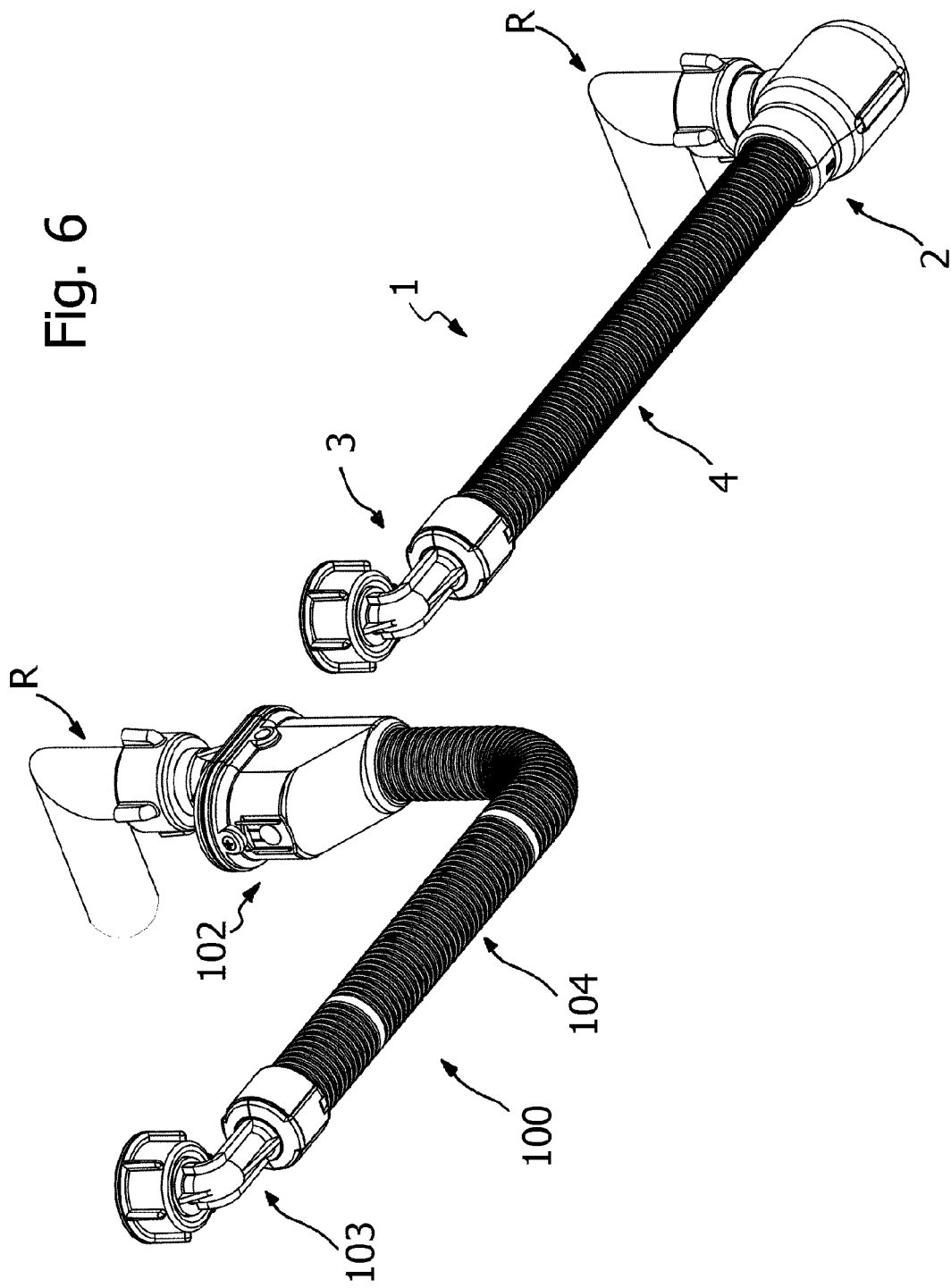

FIG. 6 illustrates a condition of installation similar to that of FIG. 5, but with the bottom connection portions 103 and 3 oriented differently (also in this case, consider, merely by way of example, the illustrated arrangement of the bodies 113 and 13 with the corresponding ring-nuts 114 and 14).

Figure 7:
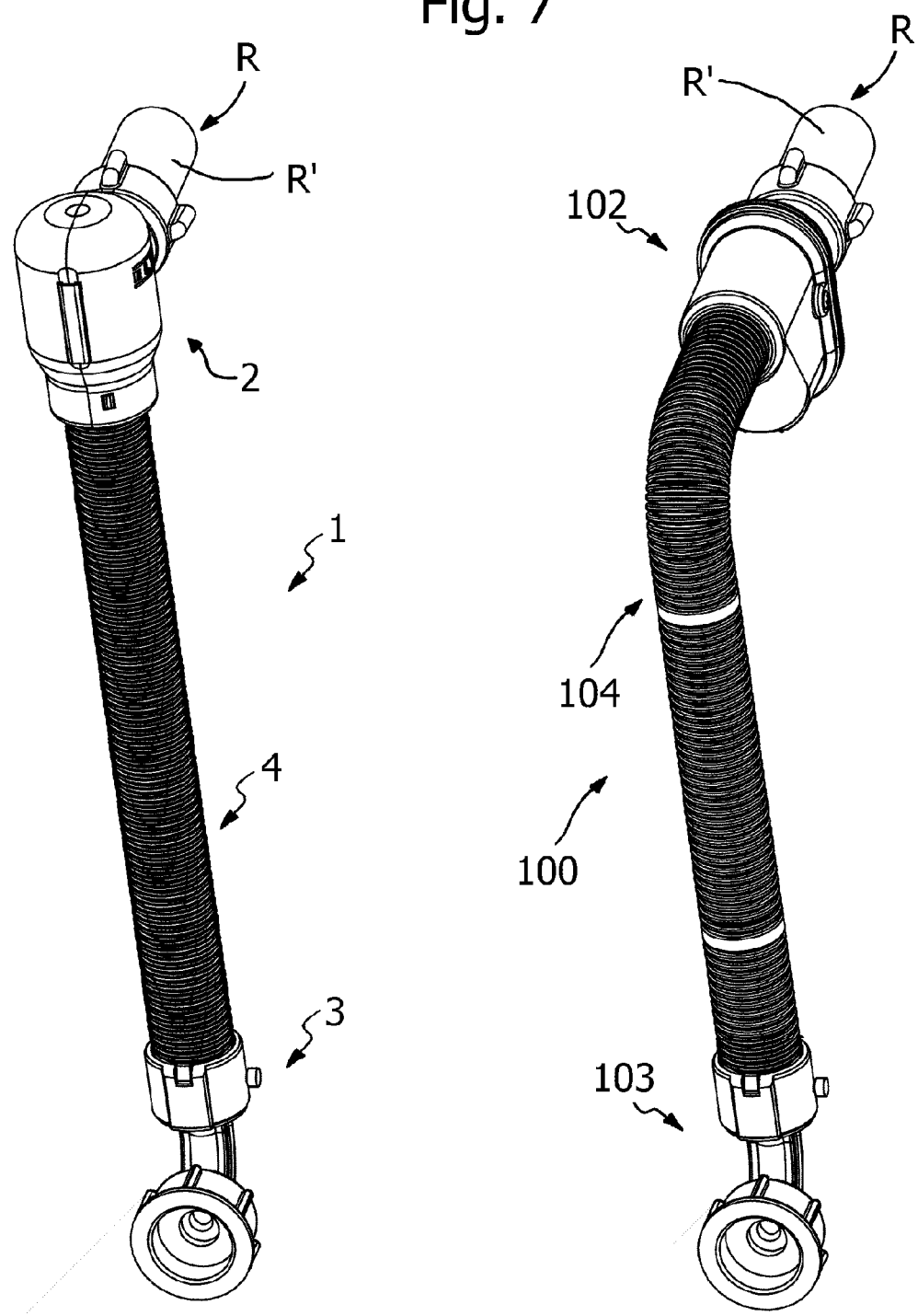
Figure 8:
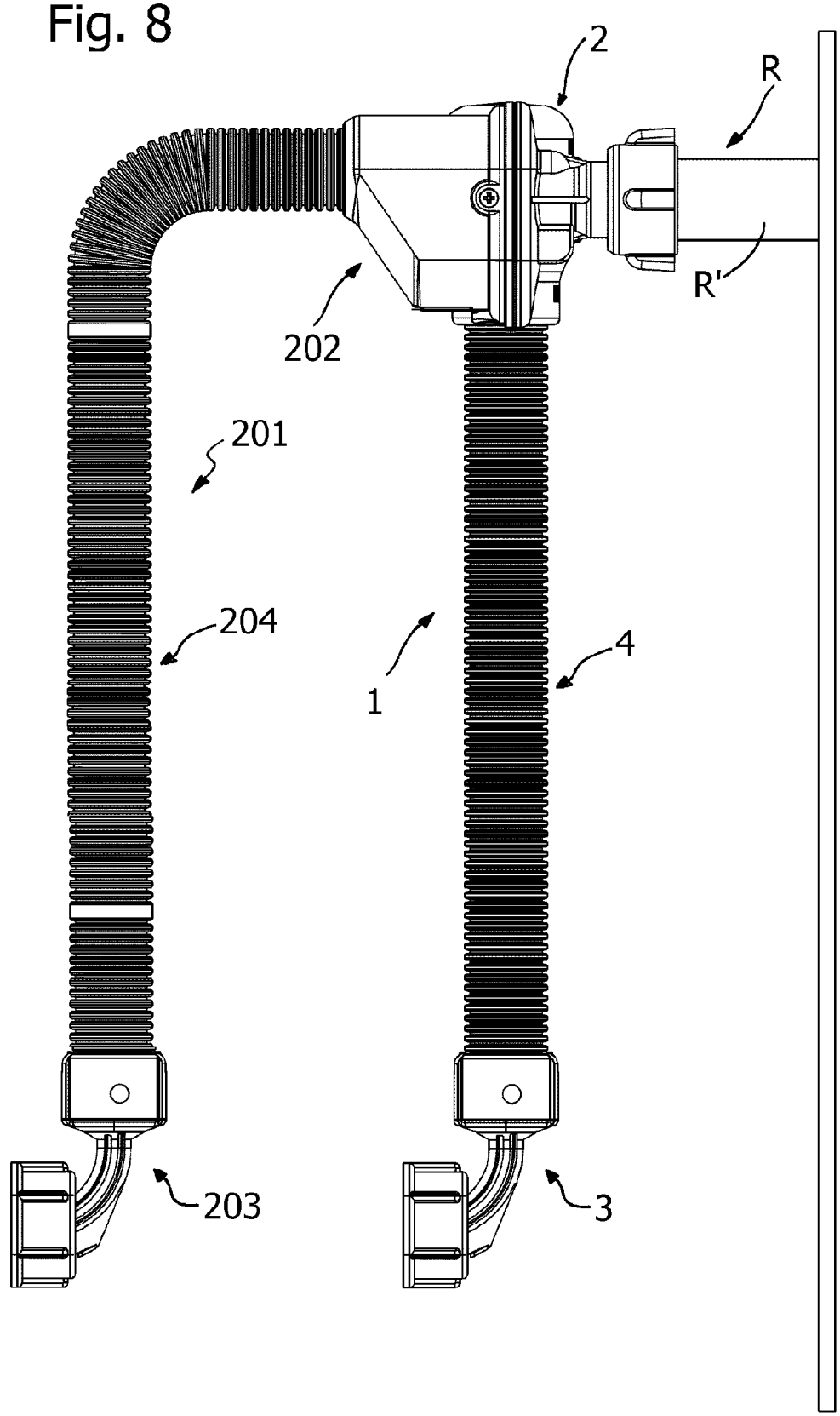

FIGS. 7 and 8 compare a known device 100 with a device 1 according to the invention, in one and the same second condition of installation. Illustrated in particular is the case of installation with a hydraulic attachment R, the terminal stretch R' of which extends substantially horizontally, i.e., orthogonal to a corresponding wall of the installation environment. It may be immediately noted from FIG. 7 how, also in this case, the type of construction of the known device 100 imposes a significant bending on the corresponding hoses, which is altogether absent in the case of the device 1 according to the invention. It will be appreciated also that said bending determines also an increased operating encumbrance of the known device 100 and that, given the same distance between the attachment R and the corresponding connection of the household appliance, the length of the hoses of the device 1 according to the invention can be shorter than that necessary for the known device 100 (or, vice versa, given the same length of the safety devices 1 and 100, with the device 1 according to the invention it is possible to connect appliances that are further away). These advantages are even more immediately evident from FIG. 8, where the known device 100 is represented in the foreground with respect to the device 1 (the top part of which 2 is hence only partially visible).

It may likewise be noted that, in the case of a connection to a built-in appliance (for example, in a kitchen cabinet), where the space is extremely limited, in particular the space at the back, connections of the known device 100 of the type illustrated in FIGS. 7 and 8 would not be possible.

FIG. 9 compares the top parts 102 and 2, respectively of the known device 100 and of a device 1 according to the invention, in particular obtained according to the teachings described hereinafter with reference to FIGS. 10-18. FIG. 9 highlights part of the characteristic encumbrance in a case of installation of the type shown in FIGS. 7 and 8, i.e., to an attachment R with horizontal terminal stretch. It will be appreciated how the horizontal encumbrance S of the part 2 of the device 1 is clearly smaller than the part 102 of the known device 100 (and without counting the further encumbrance caused by the marked bending of the hoses in the case of the known device—see FIGS. 7 and 8). It may also be appreciated how the vertical encumbrance V of the parts 2 and 102 is substantially similar for the two devices.

Even more in particular, in the device (code No. 10.0269) currently marketed by the present applicant, the dimensions S and V are approximately 100 mm and 67 mm, respectively; perfectly functioning prototypes of the device 1 according to the invention, tested by the present applicant in his own internal testing workshop, had overall dimensions S and V of approximately 73 and 66 mm, respectively (the maximum encumbrance in plan view of the two devices is substantially the same, approximately 40 mm).

Merely by way of example, illustrated in FIGS. 10-18 is a possible embodiment of a device 1 according to the invention, where the actuation of the corresponding valve arrangement is governed in a pneumatic or hydraulic way. The invention can anyway be applied also to the case of safety devices having a valve arrangement actuated mechanically, for example, by means of an anhydrous sponge, or again a valve arrangement including electrically actuated means.

Illustrated, with different views, in FIGS. 10-12 is a valve body 20, which is preferably made of injection-moulded thermoplastic material and in which there can basically be identified two substantially tubular portions 21 and 22—defined hereinafter as "inlet portion" and "outlet portion", respectively—which in the example are orthogonal to one another. The two portions 21 and 22 include respective stretches 23a, 23b of an internal duct 23 for the water and are connected in a position corresponding to an intermediate body portion 24, within which the two aforesaid stretches of duct intersect. The portion 21 defines an inlet 25 of the valve body 20, formed in the proximity of which is at least one flange. In the example illustrated, two formations with outer annular flanges 26 are provided, for installation in a known way of a ring-nut 11 (FIGS. 3-4). In the embodiment exemplified, moreover, the outer surface of the inlet portion 21 comprises a stretch 27a tapered towards the intermediate portion 24, which, together with a further flange formation 27b, provides a sort of seat 27, designed to co-operate with a casing body 12, as will emerge hereinafter.

The outlet portion 22, which defines an outlet 28 of the valve body 20, has, in a top region thereof, a series of axial projections 29, useful for the purposes of reinforcement of the body 20 and/or possibly for positioning sealing means, described hereinafter.

Figure 16:
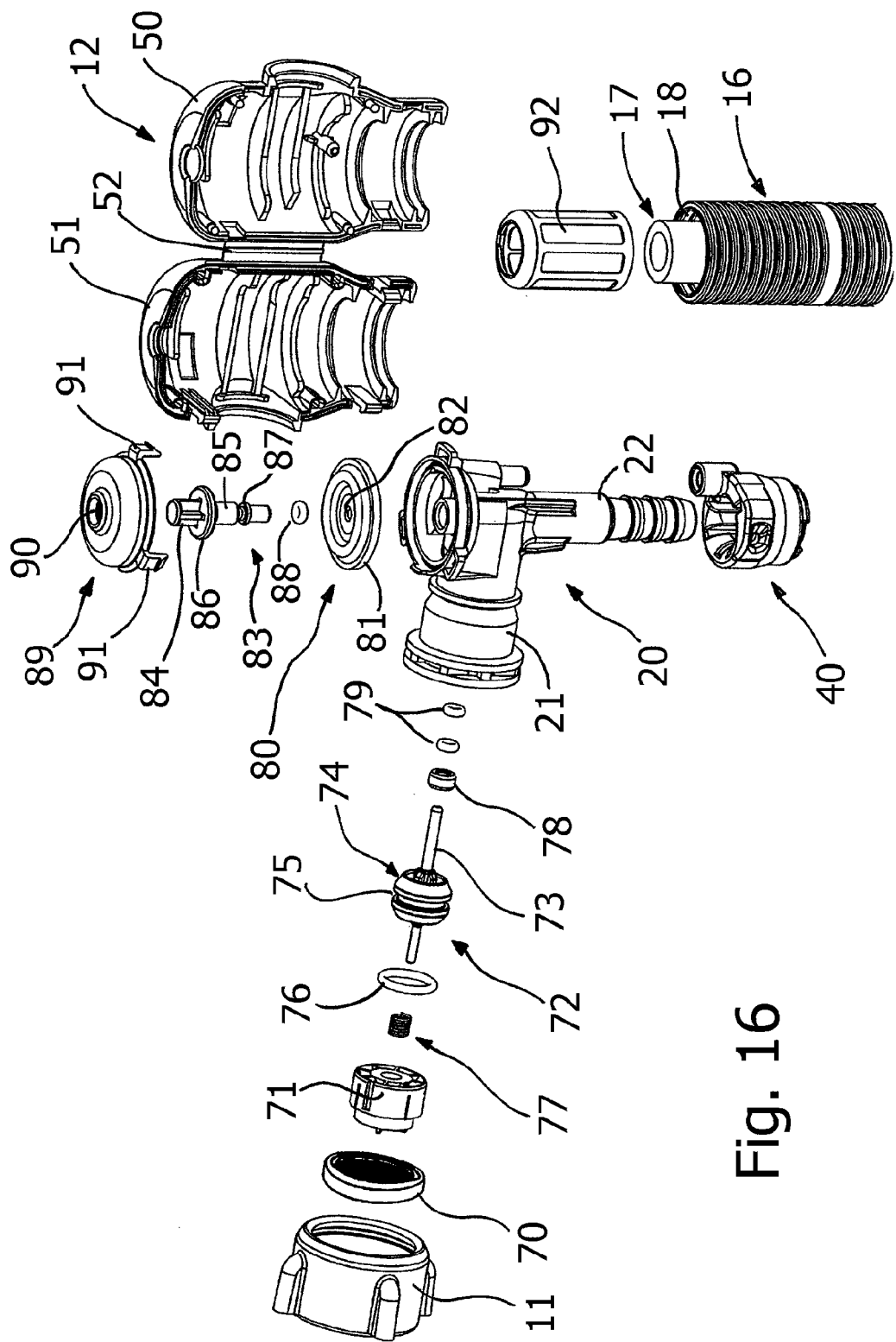
FIG. 16 is an exploded view of a portion of a device according to the invention.

A generally cylindrical bottom region of the outlet portion 22 has, on the outside, coupling elements 22a, such as a series of annular retention teeth or projections, for coupling with an inlet region or proximal end of the inner hose of the device, designated by 17 in FIG. 16. Defined between said bottom region and the bottom end of the projections 29 is an area for sealing the portion 22, preferably with circular cross section, designated by 22b.

Defined in the intermediate portion 24 of the valve body 20, and in particular in its top area (with reference to the figures), is a substantially cup-shaped cavity or housing 30 that—together with a movable or deformable element described hereinafter—provides a control chamber. In the example, at the top end of the cavity 30 the valve body 20 is shaped to define an annular seat 31, designed to house at least the peripheral edge of the aforesaid movable element, in particular an elastically deformable element, such as a membrane. Provided along the outer edge of the formation that defines the seat 31 are engagement seats 32, designed to couple with hooks or teeth of a lid, which is also described hereinafter.

Provided in a generally central region of the cavity 30 is an axially extended seat 33, for an arrest member described hereinafter. Said seat 33 extends in the axial direction of the vertical stretch 23b of the duct 23, inside the outlet portion 22 of the valve body 20, preferably coaxial therewith. From FIG. 11 it may be noted how, within the portion 21 and the corresponding horizontal stretch 23a of the duct 23, there extends a massive body portion, designated by 34, defined in which is a sliding seat 35 for the stem of an open/close member, as will be described hereinafter. As has been mentioned previously, the two stretches 23a, 23b of the duct 23, which extend in the portions 21 and 22, intersect one another in a position corresponding to the body portion 24. Given the presence of the formation 34, in the area of intersection, the stretch of duct inside the inlet portion 21 is substantially shaped like a half-ring.

From FIG. 10 it may be noted how, in the intermediate portion 24, there is provided an attachment or connection 37, which extends axially in the direction generally parallel to the outlet portion 22 of the valve body 20. In said attachment 37 there extends an axial passage 38 (visible in FIG. 12), which opens on the inside of the cavity 30.

Preferably, operatively set between the outer hose of the device 1 and the valve body 20 are sealing means. More in particular, and as will emerge more clearly hereinafter, these means provide a seal between a surface of the valve body 20, and in particular the outer surface 22b of its outlet portion 22, and at least one surface of the outer hose—designated by 16 in FIG. 16—and in particular an inner surface thereof.

In the embodiment exemplified in FIGS. 13 and 14, the aforesaid sealing means comprise a sealing member having an overall annular or tubular shape, designated by 40, which will be defined hereinafter for simplicity as "gasket", said body being made of an elastically compliant material, preferably an elastomer. The gasket 40 comprises at least one portion or surface for coupling and/or sealing with respect to the valve body 20 and at least one portion or surface for coupling and/or sealing with respect to the outer hose 16.

Identified in the gasket 40, once again with reference to the figures, are a top portion 41, an intermediate portion 42, and a bottom portion 43. Rising from the top portion 41 is a tubular part 44, the cavity of which proceeds within the body of the gasket 40 to form a connection passage 45, that opens substantially in a position corresponding to the bottom portion 43.

The tubular portion 44 can project radially from the main external profile of the top portion 41, as in the case exemplified, which is useful for the purposes of coupling with the connection 37. Once again preferably, the diameter or the perimetral dimensions of the body of the gasket 40 basically decrease from the top portion 41 towards the bottom portion 43, which facilitates in particular coupling for sealing purposes between the valve body 20 and the outer hose 16.

As may be appreciated in particular from FIG. 14, from the top face of the portion 41 there branch off seats, in particular in the form of axial grooves or recesses 46, defined around the central passage 40a of the gasket 40 and possibly extending for a short stretch also into the intermediate portion 42.

The gasket 40 is designed to be fitted from beneath on the outlet portion 22 of the valve body 20 of FIGS. 10-11, with the recesses 46 that receive, preferably with elastic interference, the axial projections 29 of the aforesaid portion 22 of the valve body 20, also in order to guarantee a precise relative positioning between the parts. In the mounted condition of the gasket 40, moreover, the attachment 37 of the valve body 20 is sealingly fitted in the tubular portion 44 of the gasket, as may be clearly seen, for example, in FIG. 18.

To return to FIGS. 13 and 14, the body of the gasket 40 preferably has, in its intermediate portion 42, a shape and dimensions such as to determine a sealed coupling with respect to the outer hose 16, such as an outer corrugated surface designed to provide an elastically sealed coupling with the corrugation of the hose 16. Of course, since the body of the gasket 40 is made of elastic material, the crests and troughs of the corrugation of the intermediate portion 42 can be slightly larger, i.e., have a larger size or diameter, than those of the corrugation of the outer hose 16, or of its internal diameter.

In one embodiment, the body of the gasket 40 preferably has, in its internal portion or central passage 40a, a shape and dimensions such as to determine an elastically sealed coupling with respect to the valve body 20, such as a diameter or size smaller than the diameter or size of the surface 22b of the outlet portion 22 of the valve body 20.

In any case, the arrangement is such that, after assembly of the gasket 40 on the valve body 20, a proximal-end portion of the outer hose 16 can be fitted with elastic interference to a portion of the gasket 40, in particular the intermediate portion 42 of the gasket itself, so as to obtain substantially a shape coupling or complementary coupling between the parts.

Figure 17:
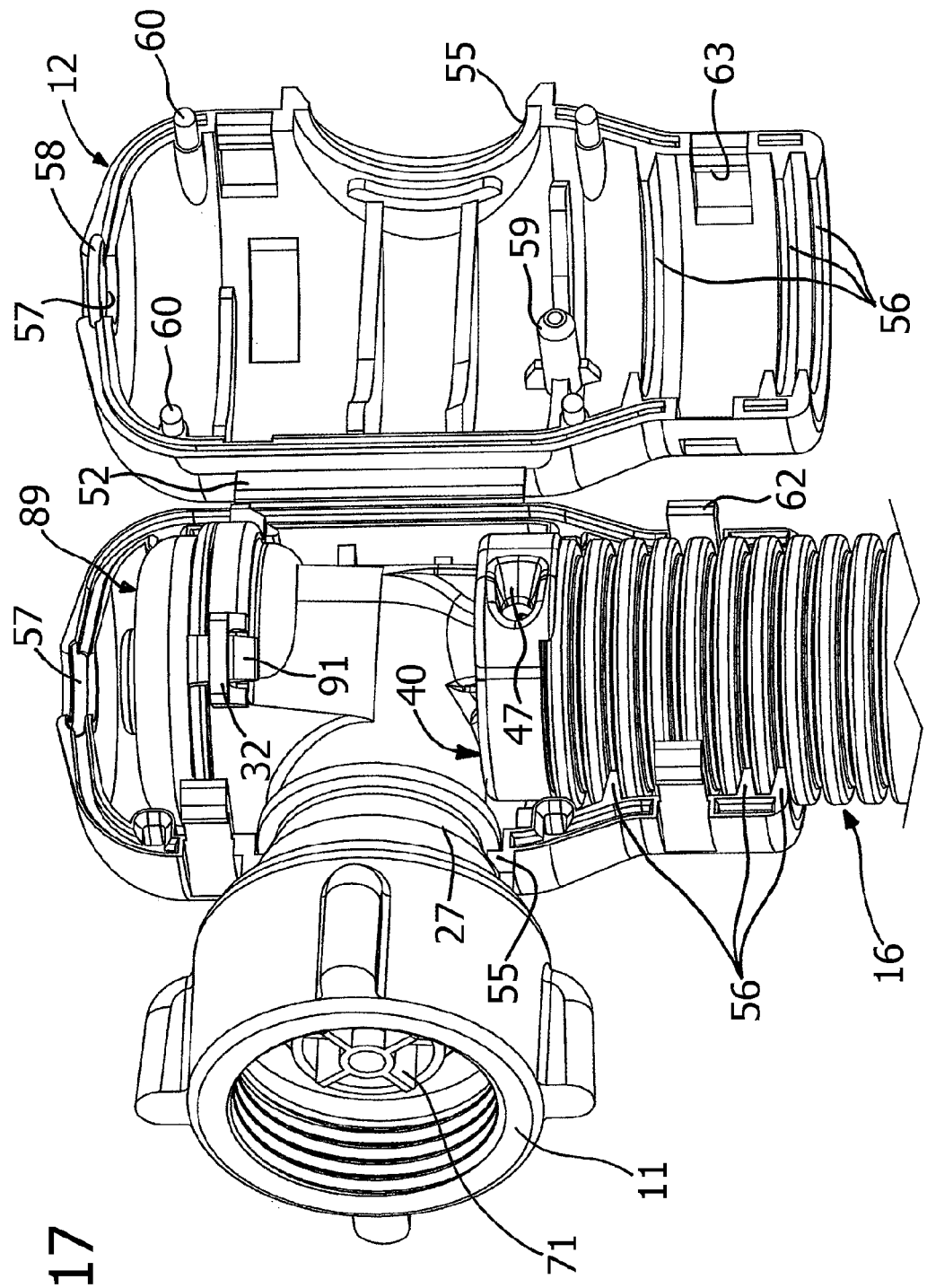
FIG. 17 is a perspective view of the portion of FIG. 16, in the partially assembled condition.

With particular reference to FIG. 17, in one embodiment, also provided in the peripheral face of the top portion of the gasket 40 is an auxiliary opening 47, which provides the inlet of an auxiliary passage, which also opens in at the bottom portion 41 of the gasket 40 (not visible in FIG. 13). It should be noted that the bottom portion 43 of the gasket 40 in use faces the inside of the annular gap defined between the outer hose 16 and the inner hose of the safety device, as may be seen, for example, in FIG. 18, where the gap is designated by 18. The opening 47 with the corresponding auxiliary passage, when these are envisaged, can be used for testing the device 1 in the production stage.

As has been said, in use the gasket 40 is fitted on the outlet portion 22 of the valve body 20 and slid thereon until engagement is obtained between the axial projections 29 (FIG. 10) and the recesses 46 (FIG. 14), as well as engagement of the sealing area 22b of the valve body 20 with the bottom portion of the passage 40a of the gasket 40. The aforesaid area 22b and the corresponding sealing portion of the passage 40a have a profile that is at least approximately circular, or in any case preferably without projections or troughs, in order to guarantee an optimal radial seal. Following upon said assembly, as may be seen in FIG. 18, fitted in the tubular portion 44 of the gasket 40 is the bottom end of the attachment 37 of the intermediate portion 24 of the valve body 20.

In this way, as may be appreciated, the cavity 30 is in fluid communication, via the passage 38 illustrated in FIG. 12, with the passage 45 of the gasket 40 (see FIGS. 14-15), and hence with the gap 18 between the two hoses. According to a variant (not represented), the connection 37 and the passage 38 can also traverse the passage 45 of the gasket 40 entirely as far as the gap, being appropriately shaped for that purpose.

From FIG. 17 it may likewise be noted how, in the condition where the gasket is mounted 40 on the valve body 20, the auxiliary opening 47 directly faces the outside, i.e., it faces radially with respect to the axis of the gasket 40 or of the valve body 20.

Figure 15:
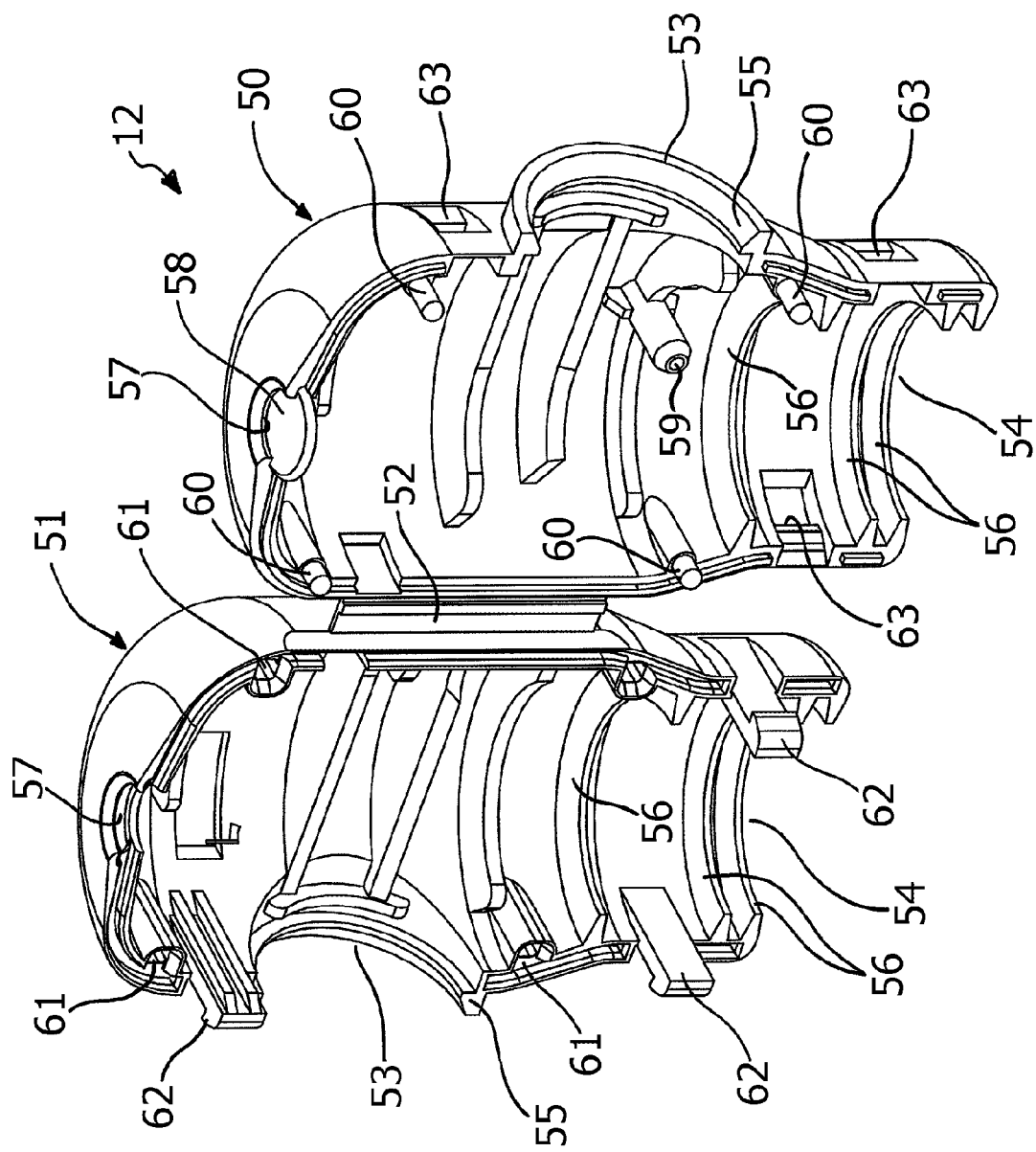
FIG. 15 is a perspective view of a casing body of the valve body of FIGS. 10 and 11.

Illustrated in greater detail in FIG. 15 is the casing body 12, defined hereinafter for simplicity as "casing", designed to enclose partially inside it the valve body 20, as well as the gasket 40 with the associated portion of the outer hose 16. The casing 12 is preferably made of thermoplastic material or a material that is at least in part elastic.

In the embodiment exemplified, the casing 12 is configured in a single piece that defines two generally concave half-shells 50 and 51, joined to one another by an intermediate portion 52 that provides an elastic hinge. It should be noted that, in possible variant embodiments, the casing 12 can be made of two or more parts distinct from one another, then rendered fixed, for example, via respective hooks or screws, or via welding.

Defined along the edge of the half-shells 50, 51 opposite to the hinge portion 52 are two first seats or recesses 53 with a substantially semicircular profile. Likewise, defined in the bottom portion of each half-shell 50, 51 are two second seats or recesses 54, which also have a substantially semicircular profile. In this way, following upon closing of one half-shell on the other, in the casing body 12 there are defined two circular passages, a lateral one and a bottom one, the central axes of which are substantially orthogonal to one another. In a position corresponding to the lateral recesses 53, the profile of the edge of the half-shells is shaped to define a semicircular projection or tooth 55. The two teeth 55, in the assembled condition of the device 1, mate with the seat 27 of FIG. 10 (see also FIG. 17), in order to guarantee a secure and centred positioning of the casing body 12 with respect to the inlet portion 21 of the valve body 20 (preferably thanks to the interaction between the inclined plane defined by the teeth 55 and the inclined plane defined by the tapered part of the seat 27 of FIG. 10 or FIG. 17). The teeth 55 can possibly operate in a sealed way with respect to the valve body 20 and/or the seat 27. Between the lateral recesses 53 and the valve body 20 there could be provided, if need be, further sealing elements (not represented). The edge of the half-shells 50, 51 that defines the bottom recesses 54 is generally tapered in order to obtain at least one semicircular projection 56, designed to engage in one of the troughs of the corrugation of the outer hose 16. Rising from the inner face of the half-shells 50, 51 are similar projections 56, designed for engagement with other troughs of the corrugation of the hose 16, as may be clearly seen in FIG. 17. In this way, in the assembled condition, the valve body 20 is coupled precisely, from a mechanical standpoint, to the outer hose 16. The projections 56 can possibly also operate in a sealed way with respect to the outer hose 16 (for example, the projections 56 can be rigid and pressed sealingly on an elastically compliant outer hose 16; between the projections 56 and the hose 16 there may possibly be provided further sealing elements, not represented).

In the top portion of the half-shells 50, 51, defined in the corresponding edge are two semicircular recesses 57, which provide an inspection window, for the purposes described hereinafter. Preferably, but not necessarily, said window also includes a transparent closing element or inspection hole, designated by 58.

In variant embodiments (not illustrated), further sealing elements can be associated to or made of a single piece with the half-shells 50 and/or 51, in particular in order to define at least one mutual seal and/or a seal with respect to at least one from among the valve body 20, the outer hose 16, and the element 58.

Once again with reference to FIG. 15, also in the inside part of the half-shells 50 and 51, in addition to possible other projections designed to co-operate with outer surfaces of the valve body 20, there is provided an axially extended appendage 59, preferably cylindrical in shape, which constitutes a closing element of the auxiliary opening 47 of the gasket 40 (FIG. 17). In the assembled condition of the casing body 12, i.e., with the two half-shells 50, 51 closed on one another and, set in between them, the valve body 20 mounted on which is the gasket 40, the appendage 59 penetrates with elastic interference into the auxiliary opening 47, stopping the corresponding passage. In one variant, the functions of the appendage 59 are performed by a different closing element, distinct from the casing 12 but in any case designed to close the auxiliary opening 47 (such as, for example, a ball inserted in a forced way in the opening 47, with the latter preferably shaped for withholding the ball in position and determine a respective hydraulic, pneumatic, and mechanical seal).

In one of the two half-shells, in the example the half-shell 50, second appendages or studs 60 are provided, designed for fitting in corresponding seats 61, provided in homologous positions on the other half-shell, here the half-shell 51. One of the two half-shells, preferably the half-shell that has the seats 61, has—along its edge—a plurality of hooks 62, here shaped like elastic teeth, designed for engagement in respective seats 63 provided in homologous positions on the other half-shell.

Illustrated in FIG. 17 is the partially assembled condition of the top portion 2 of the device 1, with the casing 12 open. There may be noted the interference between the projections 56 of the half-shell 51 of the casing 12 with the corrugation of the outer hose 16, as well as the positioning of the gasket 40 with respect to the outer hose 16 itself, i.e., with the corresponding intermediate and bottom portions that are within the proximal-end region of the hose. From the same FIG. 16 it may likewise be noted how the auxiliary opening 47 is in a position such that it can be stopped by the appendage 59 when the two half-shells are closed on one another.

FIG. 16 illustrates, in an exploded view, components associated to the valve body 20. In said figure, designated by 11 is the ring-nut already referred to above, having an internal thread, which provides part of the inlet of the valve body, constituting an interface for mechanical and hydraulic connection of the body 20 to a supply point of the source of the fluid, such as the water attachment designated previously by R. As has been said, the ring-nut 11 is of a type known in the sector, as are its modalities of anchorage to the valve body 20.

Designated by 70 is a filtering member, designed to obtain a filtration of the fluid entering the device 1, assembled on the body 20 thanks to the ring-nut 11. Also said member is of a type in itself known in the sector. The component designated by 71 is a diffuser member, designed to direct the fluid into the device 1. Also said member is of a type generally known, but is here adapted to co-operate with the stem of an open/close member forming part of the valve arrangement of the device 1. Possibly, upstream or downstream of the diffuser 71 there may be provided a flow regulator, for example, of the membrane type that is deformable under the pressure of the incoming water. The open/close member referred to is designated as a whole by 72 and basically consists of an axially extended stem 73, provided in an intermediate area of which is an open/close element 74, defining an annular seat 75 for a seal ring 76 in an intermediate part thereof. The portion of the stem 73 that projects from the element 74 in the direction of the diffuser 71 is, in the assembled condition, inserted with the possibility of sliding in an axial seat 71a of the diffuser itself, moreover housed in which is a spring 77, which provides a means for accumulating mechanical energy designed to force the open/close member 72 constantly towards the respective closed position, as will emerge hereinafter.

Designated by 78 is a guide bushing for the stem 73, whilst designated by 79 are two seal rings of an O-ring type, designed to provide a seal between the seat 35 of FIG. 11 with respect to the aforesaid stem.

Designated as a whole by 80 is the movable or deformable element referred to previously, which in the example illustrated is constituted by a membrane which can bend elastically, having substantially the shape of a disk and having a peripheral edge 81 and a central hole 82. The edge 81 is shaped to provide a sealed coupling within the seat 31 of FIG. 10, which surrounds the mouth of the cavity 30 (see also FIG. 18).

The device includes control or retention means, which are designed to withhold the open/close member 72 in a respective opening position and can be actuated for assuming a respective position of release of the open/close member itself. For this purpose, in the example represented, designated as a whole by 83 is a control or retention member for the open/close member 72, such as an axially extended arrest member, which comprises a top portion 84, here with cross-shaped cross section, and a longer bottom cylindrical portion 85, located between which is a flange portion 86. Defined in the bottom part 85 is an annular groove 87, for a corresponding sealing element 88, in particular an O-ring. In the assembled condition, the arrest member 83 is inserted with interference and/or in a sealed way within the central hole 82 of the membrane 80 in such a way that its bottom cylindrical part 85 including the sealing element 88 is in turn inserted with the possibility of sliding in the seat 33 defined centrally in the cavity 30 of the valve body 20 (see, for example, also FIGS. 10-12 and 18).

Designated by 89 is a fixing element or lid, which is designed to be coupled to the top part of the valve body 20. The lid 89 is generally dome-shaped, with a central passage 90 that provides a guide for the axial movement of the arrest member 83. Provided along the peripheral edge of the lid 89 are engagement teeth 91, designed to mate with the corresponding engagement seats 32 defined in the top part of the valve body 20 (see FIG. 10). In the assembled condition, as may be appreciated from FIGS. 17 and 18, the lid 89 thus withholds the peripheral edge 81 of the membrane 80 within the corresponding seat 31, with the membrane itself that is set between the valve body 20 and the lid, preferably in a condition of compression and/or sealing of the peripheral edge 81. The top portion 84 of the arrest member 83 projects, instead, on the outside of the control chamber formed by the cavity 30 and by the membrane 80, and is inserted in the passage 90 of the lid 89, which provides a guide therefor. The fact that the top portion 84 of the member 83 is inserted in the guide 90 and the bottom cylindrical part 85 of the member itself is inserted in the seat 33 constrains the member itself to perform a linear movement, also providing an indirect guide for bending of the elastic membrane 80.

Figure 18:
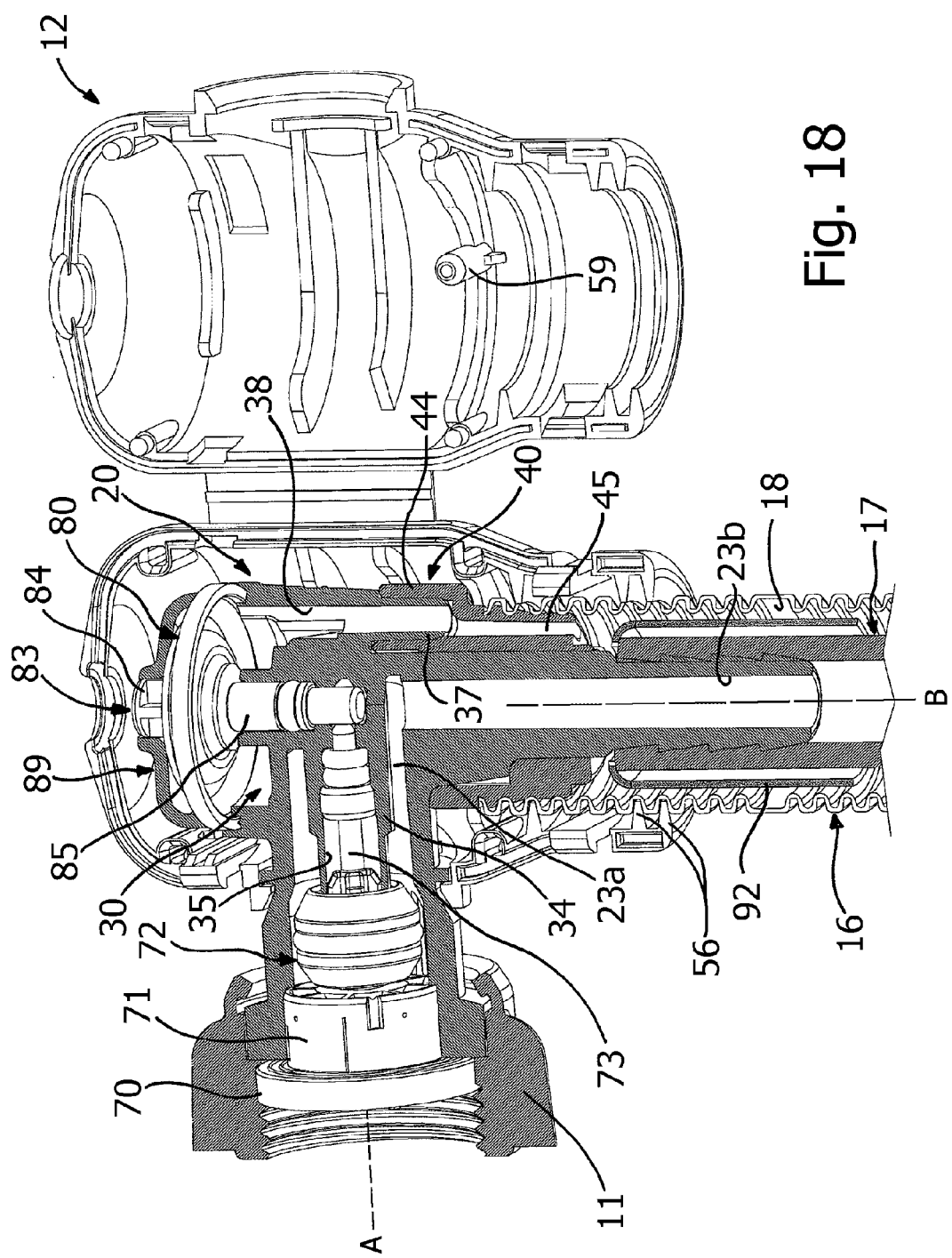
FIG. 18 is a view similar to that of FIG. 17, but with the valve body and some elements associated thereto partially sectioned.

From FIG. 18 it may be noted how, in the assembled condition, the top portion 84 of the member 83, and in particular its top face, faces the window 57-58 of the casing body 12. At least part of this top portion 84 has an appropriate colouring, preferably different from that of the casing 12, to obtain a system for visual signalling of the state of the device 1.

Once again in FIG. 16, designated by 92 is a fixing or sealing bushing, designed to grip the proximal end of the inner hose 17 of the device mechanically on the toothed terminal part of the outlet portion 22 of the valve body 20, as may be seen, for example, in FIG. 18. Consider, however, that the fixing bushing 92, typically provided for a smooth inner hose 17 made of elastomer, can be replaced by other fixing and/or sealing element, such as a sealing element made of elastomer overmoulded on an inner hose of some other type, for example, a corrugated hose made of thermoplastic material.

In FIG. 16 there are also visible in part both the outer hose 16 and the inner hose 17. The materials used for producing the hoses 16 and 17 may be of a type known in the sector, for example, PP for the outer hose 16 and PVC or PP for the inner hose 17.

The bottom connection body 13, and the components associated thereto, are not illustrated in detail in the figures, in so far as they can be obtained according to modalities in themselves known to the person skilled in the branch. Here it will suffice to point out that, in the non-limiting example illustrated, the connection body 13 is generally L-shaped so as to define inside it a duct, having an inlet and an outlet, orthogonal to one another, where connected sealingly at the inlet end of said duct is the distal end of the inner hose 17. In addition, associated to the connection body 13 are sealing and mechanical-fixing means, aimed at sealing the gap 18 at the bottom, with modalities in themselves known. These means can comprise, for example, an elastically compliant annular seal element, set between the connection body 13 and the inside of the hose 16, and the bushing 15 of FIGS. 2 and 3, which blocks the outer hose 16 mechanically in position on the aforesaid annular sealing element. At its outlet end, the connection body 13 then has a flange (not visible), set up against which is a plane gasket, withheld in position by the ring-nut 14.

Shown in FIGS. 17 and 18 is the assembled condition of the basic parts of the safety device 1. In said figures there may be clearly seen the gap 18 defined between the hoses 16 and 17. In the embodiment exemplified, the gap 18 has, as has been said, a substantially annular shape. There may moreover be clearly seen the angled arrangement—here orthogonal—of the axes designated by A and B, which correspond to the axes of the stretches of duct 23a and 23b. It may moreover be appreciated how the ring-nut 11, the filter 70, the diffuser 71 (and the possible flow regulator) substantially share the axis A, whilst the proximal end of the inner hose 17 (as well as of the outer hose 16) substantially shares the axis B.

From FIG. 18 it may be clearly seen how the proximal end of the outer hose 16 extends beyond the proximal end of the inner hose 17, with the sealing means, represented by the gasket 40, which are mounted on the valve body 20 in an area of the latter that is located at a distance in axial direction, or further up, with respect to the proximal end of the hose 17, and hence in an intermediate area between the inlet and the outlet of the valve body 20, also to the advantage of compactness of the device 1.

FIG. 18 illustrates the condition of normal operation of the device 1, where the water at inlet from a threaded attachment R' secured on which is the ring-nut 11 of the inlet can penetrate into the horizontal stretch of duct 23a, passing through the filter 70 and the diffuser 71. In said condition, the elastic membrane 80 is in a respective inoperative condition, where the arrest member 83 is in a generally lowered position. In said position, abutted on the arrest member 83 is the inner end of the stem 73 of the open/close member 72. In this way, the open/close member 72, and in particular its element 74, is kept in a position for opening the duct 23, countering the action of the spring 77 of FIG. 16 (not visible in FIG. 18).

In practice, then, the element 74 of the open/close member is kept at a distance from the corresponding valve seat, defined in the surface of the horizontal stretch of duct 23a. Consequently, in said condition, the water can traverse the stretch of duct 23*a* and then pass into the vertical stretch of duct 23*b*, defined axially in the outlet portion of the valve body 20, to pass into the inner hose 17. At the distal end of the inner hose 17 the fluid penetrates then into the internal duct in the bottom connection 13, to reach the household appliance.

In the case of leakage of fluid inside the device, for example, from the inner hose, for instance, following upon failure thereof, there is a passage of water into the gap 18. The volume defined by the gap 18, by the passages 44-45 of the gasket 40 and by the control chamber 30, 80 with the corresponding duct 37-38, is a substantially closed volume, designed to convey and contain any leaks of water without it coming out of the device, at least in the time elapsing between leakage and triggering of the valve arrangement. It may be noted that, where envisaged, the opening 47 of the gasket 40 is stopped by the appendage 59 of the casing body 12. Consequently, the leaking water that penetrates into the gap 18 is such as to cause an increase in pressure within the aforesaid space.

The above increase in pressure is transferred, through the passage 44-45 of the gasket 40 and the corresponding duct 37-38 of the valve body 20, within the control chamber formed by the cavity 30 and by the membrane 80. The increase in pressure in said chamber brings about elastic bending of the membrane 80 upwards, and hence raising of the arrest member 83. Said raising of the member 83 has the effect of releasing the stem 73 of the open/close member 72, which thus, under the action of the corresponding spring, passes into the condition of closing of the duct 23, and in particular of the horizontal stretch of duct 23*a*. In this way, any further inflow of water is prevented inside the device 1, and hence towards the household appliance. Preferably, the mechanism is such as to ensure safe or stable actuation, i.e., an actuation of the open/close member into the closing position that cannot be restored or modified autonomously, for example, on account of a reduction in pressure of the fluid in the gap 18 and/or in the control chamber.

Given the raising of the membrane 80, and hence of the arrest member 83, the top portion 84 of the latter, guided by the passage 90 of the lid 89, reaches, or at least approaches, the window 57-58 defined in the top face of the casing 12. As has been mentioned previously, the colouring of the top portion 84 of the member 83 is preferably different from that of the casing body 12 so that the varied position of the member 83 is more easily perceptible from outside the casing, through the window 57-58. The user, in this way, can detect actuation of the safety device 1, i.e., its triggering for interrupting inflow of water towards the household appliance.

In certain conditions of installation—for example, with the device 1 mounted substantially horizontally, or else vertically and with the valve body 20 in a bottom position, i.e., connected to the household appliance instead of to an attachment R—it is possible that it is the leakage of water itself that reaches the control chamber and causes bending of the membrane 80, with consequent displacement of the arrest member 83. Also in order to favour an operation of this sort, the valve body 20 may be provided with a venting micro-duct having a cross section smaller than one millimeter or in any case of dimensions such as to allow venting of the air from the gap 18, but without allowing outlet of a significant amount of water from the device, at least in the time elapsing between leakage and triggering of the valve arrangement. Said micro-duct is preferably defined at least in part in at least one between the valve body 20 and the connection body 13, even though there is not to be ruled out the possibility of providing it at least in part in at least one between the body of the gasket 40 and the body of a sealing element 98.

Said micro-duct is particularly advantageous also for preventing risks of defectiveness, and in particular for preventing that during storage of the device 1 there might occur anomalous actuation thereof, caused by the increase of internal pressure due to variations of ambient temperature, in particular following upon heating.

As may be seen, in the embodiment exemplified, the command for release of the open/close member is generated directly by the leaking fluid, either pneumatically or hydraulically, or else in a combined way (hydro-pneumatically), and acts very rapidly on the arrest member, by means of the movable element represented by the membrane 80. Thanks to the presence of the means for accumulating mechanical energy represented by the spring 77 of FIG. 16, which constantly force the open/close member into its closing position, the operation of the device 1 exemplified is not affected by the conditions of pressure of the mains water supply (the presence of the means for accumulating mechanical energy prevents, in extremely unfavourable conditions—such as triggering of the safety mechanism with low mains pressure or triggering followed by a negative pressure in the mains supply—, the open/close element from possibly re-opening temporarily, enabling a further inflow of water).

The presence of the gasket 40 enables substantial closing of the gap 18 at its top end, leaving in any case a passage of relatively restricted cross section to facilitate detection of the over-pressure by the membrane 80 or to enable the passage of the water right into the cavity 30.

From what has been described previously, it will be appreciated that the safety device 1 exemplified previously is perfectly able to function also in the absence of the casing 12 provided that the auxiliary opening 47 of the gasket 40—if envisaged—is stopped in some way. In one embodiment, said auxiliary opening 47 is provided to enable testing of the device 1 in the production stage. For this purpose, prior to assembly of the casing 12, it is sufficient to inject air into the auxiliary opening 47, in such a way as to cause an increase of pressure within the substantially closed volume referred to previously. Said increase in pressure brings about bending of the membrane 80, and hence raising of the arrest member 83, as explained previously, thus simulating triggering of the safety mechanism of the device 1. Once operation of the device 1 has been verified, there must of course be restored the condition of opening of the duct 23. This can be obtained by freeing the auxiliary opening 47, by causing recession of the open/close member 72 towards the corresponding original position and lowering of the arrest member 83 into its position for withholding of the open/close member.

The idea underlying the invention, i.e., that of providing a valve body with inlet and outlet substantially angled with respect to one another or set transversely with respect to one another, in particular orthogonal, can be applied also to the case of safety devices with a control system different from the pneumatic or hydraulic one exemplified previously, for example, of the type described in the document No. DE-C-3743842.

It is therefore pointed out that the structure and characteristics described previously by way of example for the device 1 can to a large extent be used also in the case of actuation of the valve arrangement by means of a deformable element different from a membrane, such as, for example, an anhydrous sponge. This can be obtained, very simply, by associating to the arrest member 83 an anhydrous sponge, which is housed in the cavity 30 or in a similar housing, operatively set between the bottom of the cavity itself and a suitable contrast element associated to the member 83, for example, its intermediate flange 86. In such an embodiment, the cavity 30 does not necessarily have to be closed sealingly in its top part, and hence the membrane 80 can be omitted. For such an application, moreover, the lid 89, if envisaged, can be provided with an opening 90 smaller than the one illustrated for venting the air, or said venting can be obtained by exploiting a minimal gap existing between the lid 89 and the body 20 in the absence of a specific opening on the lid.

In such an embodiment, when the sponge is in the anhydrous condition, and hence has a reduced volume, the arrest member 83 is located in a position resembling the one shown in FIG. 18. When, instead, the leaking water reaches the cavity 30 and causes wetting of the sponge, the latter increases in volume between the bottom of the cavity 30 and the aforesaid contrast element, thus generating a force that raises the arrest member 83. The open/close member 72 is thus released and can move into the position that closes the duct 23, as described previously.

The idea underlying the invention can hence also be applied to the case of anti-flooding devices where a command for triggering of a safety mechanism of a pneumatic type is generated in a position remote from the valve body or the gap of the device (for example, within the household appliance) and/or where said command is not caused directly by a leakage of liquid, but by a corresponding sensor/actuator.

As has been mentioned previously, moreover, the idea underlying the invention can be applied also to the case of anti-flooding safety devices of the type where the valve arrangement is of an electrical type, for example, comprising a solenoid valve of a type in itself known, said open/close member being designed to close the duct 23, for example, along its vertical stretch 23*b*, which will be purposely provided with a corresponding valve seat (for example, a valve seat of the type described in EP-A-1798326), the teachings of which in relation to said aspect are considered incorporated in the present description.

Of course, moreover, the idea underlying the invention finds application also in the case of safety devices where the outer hose and the corresponding gap are open in their bottom part, i.e., towards the inside of the household appliance, to convey towards a collecting container the leaking water, in said container there being provided the water-detection means that generate the command for closing the aforesaid solenoid valve, whether it is a command of an electrical type, such as, for example, in the document No. EP-A-1798326 already referred to above, or a mechanical type, such as, for example, in the document No. DE-A-4402502, or else a pneumatic type, such as, for example, in the document No. DE-C-3743842 already referred to above, the teachings of said documents in this regard being considered incorporated in the present description.

From the foregoing description there emerge clearly the characteristics of the present invention, as likewise do the advantages that it affords. It is clear that numerous variants are possible for the person skilled in the branch to the anti-flooding safety device described herein by way of example, without thereby departing from the scope of the invention, as defined by the annexed claims.

The foregoing description has been made with particular reference to an arrangement of the inlet and of the outlet of the valve body 20 substantially at 90°. As already mentioned, on the other hand, the advantages of the invention can be achieved also with other angular arrangements of the axes of the inlet and of the outlet, which will be preferably comprised between approximately 90° and approximately 135°, and more preferably comprised between approximately 90° and approximately 115°.

Among the possible variants, there may be cited, for example, the possibility of providing a casing for the valve body 20 via over-moulding or co-moulding of material, for example, a thermoplastic material, directly on the valve body itself. Also with such an embodiment, the aforesaid casing will be configured so as to have two passages the axes of which will be set transverse to one another, where an axially extended portion of the valve body 20 that includes the inlet with the corresponding ring-nut will project from one of said passages, whilst the outer hose or else a second axially extended portion of the valve body including the corresponding outlet will project from the other passage.

In accordance with a further variant (not represented), it is possible to define directly in the valve body a testing passage having purposes similar to those of the opening designated previously by 47, in direct communication with the gap or else with the control chamber. In said embodiment, the testing passage can be sealed, after testing, with a closing element, such as a ball forced into place, or else by means of an element belonging to the casing 12 or carried thereby, having a function similar to the one designated above by 59 (for example, an element made of elastic material mounted on a rigid projection of the type designated previously by 59).

The first sealing means, i.e., the gasket 40, can possibly be associated to the valve body via a moulding of elastomeric material, such as an over-moulding or co-moulding. Furthermore, first sealing means, i.e., the gasket 40, can, if necessary, be configured for operating or being set between the valve body 20 and an end portion and/or an external area of the hose 16.

In a possible variant, the valve arrangement of one of the connection bodies is devised with the corresponding open/close element designed to pass into the respective closing position under the thrust of the incoming fluid and then be engaged in said position by suitable retention means.

The structure of the open/close member 72, including the corresponding stem 72 and the element 74 can be made of a single piece. On said structure the corresponding sealing means 76 may even be overmoulded. Likewise, also the sealing means 88 of the arrest member 83 can be moulded on the latter; possibly, also the body of the membrane 80 can be moulded on the body of the arrest member 83. In general terms, one or more parts, such as the various sealing elements, can be overmoulded on or co-moulded with rigid bodies of the device.

The invention claimed is:

1. An anti-flooding safety device for a user apparatus, designed for connection between a supply point of a mains water supply and the user apparatus, said device comprising:
   at least one first connection body defining a first duct for the water, the first duct having an inlet and an outlet which extend according to respective longitudinal axes, the inlet of the first duct being provided for connection to the supply point of the mains supply;
   an inner flexible hose and an outer flexible hose impermeable to water, wherein the inner flexible hose has a proximal end, which is sealingly fixed at the outlet of the first duct, and a distal end, which is provided to be set in fluid communication with the user apparatus, and wherein the inner flexible hose extends longitudinally within the outer flexible hose so that defined between at least part of the two flexible hoses is a gap designed to convey towards the user apparatus and/or to withhold inside it any possible leaking water; and a valve arrangement mounted on the first connection body and comprising an open/close member, displaceable within the first connection body and designed to pass from a position of opening of the first duct to a position of closing of the first duct following upon detection of a leakage of water, wherein the axis of said inlet extends in a direction transverse to the axis of said outlet, wherein the device additionally comprises an outer casing body, which is set on the outside of the first connection body and is configured for enclosing at least a part of the first connection body which is intermediate to said inlet and said outlet, wherein the outer casing body has a first passage and a second passage set coaxial to the inlet and to the outlet of the first duct, respectively;

wherein the first duct comprises a first duct portion and a second duct portion which extend according to respective axes set transversely with respect to one another, the inlet and the outlet of the first duct being, respectively, at an inlet end of the first duct portion and at an outlet end of the second duct portion;

wherein the valve arrangement includes means for accumulating mechanical energy, to force the open/close member into the respective position of closing, and an axially extended retention member for withholding the open/close member in the respective position of opening against the action of said means for accumulating mechanical energy;

wherein the retention member is coaxial to said second duct portion and is displaceable from a withholding position to a release position following upon detection of a leakage of water; and wherein the open close/member is mounted slidably within said first duct portion and includes a stem having a distal end abutting against an end portion of the retention member when the retention member is in said withholding position, in such a way that, following upon detection of a leakage of water, the retention member moves in a first direction from said withholding position to said release position, thereby enabling the open/close member to move in a second direction transverse to the first direction, from said position of opening to said position of closing, under the action of the means for accumulating mechanical energy.

2. The device according to claim 1, wherein the axis of said inlet and the axis of said outlet form between them an angle comprised between 90° and 135°.

3. The device according to claim 1, comprising a second connection body, defining a second duct for the water, having an inlet connected to the distal end of the inner flexible hose and an outlet provided for connection to the user apparatus.

4. The device according to claim 1, wherein:
projecting from the first passage of the outer casing body is a first axially extended portion of the first connection body forming part of said inlet, and
projecting from the second passage of the outer casing body is at least one of the outer flexible hose and a second axially extended portion of the first connection body forming part of said outlet.

5. The device according to claim 1, wherein at least one portion of the outer casing body is configured for coupling with an outer surface of at least one of the outer flexible hose and a sealing member having an elastically yielding body co-operating with the outer flexible hose.

6. The device according to claim 1, wherein the first connection body has a signalling arrangement associated thereto, designed to provide a visual signal of the passage of the valve arrangement into the respective position of closing, and the outer casing body defines an inspection window in a position corresponding to said signalling arrangement, at a distance therefrom.

7. The device according to claim 1, wherein
the first connection body comprises a first piece made of a molded thermoplastic defining integrally a first axially extended portion forming part of said inlet and a second axially extended portion forming part of said outlet,
the outer casing body comprises a second piece made of a molded thermoplastic set on the first piece made of a molded thermoplastic.

8. The device according to claim 1, wherein the outer casing body is overmolded on the first connection body.

9. The device according to claim 1, wherein the outer casing body comprises at least two parts coupled on the connection body in a separable way.

10. The device according to claim 1, further comprising an annular gasket having an elastically yielding body defining an upper gasket portion and a lower gasket portion, and wherein
the first connection body comprises an axially extended portion including said outlet,
said elastically yielding body is mounted on said axially extended portion of the first connection body,
the proximal end portion of the outer flexible hose is fitted on the lower gasket portion,
the outer casing body is fitted on the first connection body in such a way that the upper gasket portion is housed within the outer casing body.

11. The device according to claim 10, wherein the elastically yielding body has an opening that is in fluid communication with the gap and that is sealingly closed by a corresponding closing element defined at an inner side of the outer casing body.

12. The device according to claim 1, wherein the outer casing body comprises at least two half-shells coupled to each other with said part of the first connection body set therebetween.

13. The device according to claim 12, wherein said two half-shells are joined to one another by an intermediate portion that provides a hinge.

14. The device according to claim 13, wherein
each half-shell has a side edge opposite to the hinge portion and a lower edge transverse to the side edge,
defined in the side edge of each half-shell is a first recess and defined in the lower edge of each half-shell is a second recess,
in such a way that with the two half-shells coupled to each other the first recesses form said first passage of the casing body and the second recesses form said second passage of the casing body.

15. The device according to claim 1, wherein the outer flexible hose is a corrugated hose and an inner side of the outer casing body is at least in part configured for shape coupling with a corrugation of an outer side of the outer flexible hose.

16. The device according to claim 1, wherein an inner side of the outer casing body is at least in part configured for coupling with a corresponding coupling seat defined in an outer side of the first connection body.

17. An anti-flooding safety device against leakage of a fluid for a user apparatus, designed for connection between a supply point of the fluid and the user apparatus, comprising:
- a first connection body, defining a first duct having an inlet and an outlet,
- at least one fluid-actuated valve arrangement on the first connection body, the valve arrangement including an open/close member, mounted displaceable within the first connection body and designed to assume a position of opening and a position of closing of the first duct, and means for accumulating mechanical energy, to force the open/close member towards the respective position of closing of the first duct,
- control means, designed to keep the open/close member in the respective position of opening against the action of said means for accumulating mechanical energy, the control means being displaceable for assuming a respective position of release of the open/close member; and
- an inner flexible hose and an outer flexible hose impermeable to the fluid,
- wherein the inner flexible hose extends longitudinally at least in part within the outer flexible hose so that defined between at least part of the two flexible hoses is a gap designed to convey towards the user apparatus and/or to withhold inside it any possible leaking fluid,
- wherein the first connection body has a control chamber that is at least in part delimited by a an elastically deformable element designed for bending between an inoperative position and an operative position;
- wherein the control means comprise an axially extended displaceable control member coupled to the elastically deformable element, such that a bending of the elastically deformable element from the inoperative position into the operative position causes a displacement of the displaceable control member towards the position of release of the open/close member;
- wherein the gap is in fluid communication with the control chamber in such a way that an internal leakage of fluid towards the gap causes a bending of the elastically deformable element from said inoperative position to said operative position, and therewith displacement of the displaceable control member towards the respective position of release of the open/close member, in said position of release the open/close member being forced by the means for accumulating mechanical energy to the respective position of closing of the first duct,
- wherein the first duct comprises a first duct portion and a second duct portion which extend according to respective axes set transversely with respect to one another, the inlet and the outlet of the first duct being, respectively, at an inlet end of the first duct portion and at an outlet end of the second duct portion;
- wherein the displaceable control member is configured for withholding the open/close member in the respective position of opening against the action of said means for accumulating mechanical energy;
- wherein the displaceable control member is coaxial to said second duct portion and is displaceable from a respective withholding position to a respective release position following upon bending of the elastically deformable element from the inoperative position into the operative position; and
- wherein the open close/member is mounted slidably within said first duct portion and includes a stem having a distal end abutting against an end portion of the displaceable control member when the displaceable control member is in the respective withholding position,
- in such a way that, following upon said bending of the elastically deformable element caused by said internal leakage of fluid towards the gap, the displaceable control member moves in a first direction from said withholding position to the respective release position, thereby enabling the open/close member to move in a second direction transverse to the first direction, from said position of opening to said position of closing, under the action of the means for accumulating mechanical energy.

18. A safety device against fluid leaks for a user apparatus, designed for connection between a source of a fluid and a user apparatus, comprising:
- a first connection body and a second connection body, which define a first duct and a second duct for the fluid, respectively, the first connection body having a control chamber,
- a valve arrangement, which includes a valve member mounted displaceable within the first connection body and designed to assume a position of opening and a position of closing on the first duct,
- a flexible inner hose and a flexible outer hose which are impermeable to the fluid, the flexible outer hose having a proximal end portion,
- wherein the flexible inner hose connects in fluid communication the first duct and the second duct and extends longitudinally within the flexible outer hose, such that between at least a part of the two flexible hoses a gap having a proximal end and a distal end is defined, the gap being configured for withholding therein possible leaking fluid,
- wherein the safety device further comprises an annular sealing gasket having a body made of an elastically yielding material, arranged on an outer side of the first connection body between the flexible outer hose and the first connection body,
- wherein the body made of an elastically yielding material has an outer profile and an inner profile, said inner profile being defined by a central passage of the body made of an elastically yielding material which is shaped and dimensioned to determine a sealed elastic coupling with at least one portion of said outer side of the first connection body, and said outer profile being sealingly coupled with respect to said proximal end portion of the outer hose,
- wherein the body made of an elastically yielding material defines, between said outer profile and said and inner profile, a connection passage having a perimetrical profile, for putting in fluid communication said gap with said control chamber of the first connection body,
- wherein the first duct comprises a first duct portion and a second duct portion which extend according to respective axes set transversely with respect to one another, an inlet and an outlet of the first duct being, respectively, at an inlet end of the first duct portion and at an outlet end of the second duct portion;
- wherein the valve arrangement includes means for accumulating mechanical energy, to force the valve member into the respective position of closing, and an axially extended retention member for withholding the valve member in the respective position of opening against the action of said means for accumulating mechanical energy;

wherein the retention member is coaxial to said second duct portion and is displaceable from a withholding position to a release position following upon detection of a leakage of water by the control chamber; and wherein the valve member is mounted slidably within said first duct portion and includes a stem having a distal end abutting against an end portion of the retention member when the retention member is in said withholding position, in such a way that, following upon detection of a leakage of water, the retention member moves in a first direction from said withholding position to said release position, thereby enabling the valve member to move in a second direction transverse to the first direction, from said position of opening to said position of closing, under the action of the means for accumulating mechanical energy.

19. An anti-flooding safety device for a user apparatus, designed for connection between a supply point of a mains water supply and the user apparatus, said device comprising:

at least one first connection body defining a first duct for the water, the first duct having an inlet and an outlet which extend according to respective longitudinal axes, the inlet of the first duct being provided for connection to the supply point of the mains supply;

an inner flexible hose and an outer flexible hose impermeable to water, wherein the inner flexible hose has a proximal end, which is sealingly fixed at the outlet of the first duct, and a distal end, which is provided to be set in fluid communication with the user apparatus, and wherein the inner flexible hose extends longitudinally within the outer flexible hose so that defined between at least part of the two flexible hoses is a gap designed to convey towards the user apparatus and/or to withhold inside it any possible leaking water; and a valve arrangement mounted on the first connection body and comprising an open/close member, displaceable within the first connection body and designed to pass from a position of opening of the first duct to a position of closing of the first duct following upon detection of a leakage of water, wherein the axis of said inlet extends in a direction transverse to the axis of said outlet, wherein the device additionally comprises an outer casing body, which is set on the outside of the first connection body and is configured for enclosing at least a part of the first connection body which is intermediate to said inlet and said outlet, the outer casing body having a first passage and a second passage set coaxial to the inlet and to the outlet of the first duct, respectively, an annular gasket having an elastically yielding body defining an upper gasket portion and a lower gasket portion, and wherein:

the first connection body comprises an axially extended portion including said outlet, said elastically yielding body is mounted on said axially extended portion of the first connection body, the proximal end portion of the outer flexible hose is fitted on the lower gasket portion, and the outer casing body is fitted on the first connection body in such a way that the upper gasket portion is housed within the outer casing body.

* * * * *